(12) United States Patent
Sakanashi et al.

(10) Patent No.: US 10,769,268 B2
(45) Date of Patent: Sep. 8, 2020

(54) INFORMATION PROCESSING DEVICE, INFORMATION PROCESSING SYSTEM, AND INFORMATION PROCESSING METHOD

(71) Applicants: Ryutaro Sakanashi, Kanagawa (JP); Yuuichiroh Hayashi, Kanagawa (JP); Yasuharu Fukuda, Kanagawa (JP); Seiichi Kondo, Kanagawa (JP); Taichi Watanabe, Kanagawa (JP)

(72) Inventors: Ryutaro Sakanashi, Kanagawa (JP); Yuuichiroh Hayashi, Kanagawa (JP); Yasuharu Fukuda, Kanagawa (JP); Seiichi Kondo, Kanagawa (JP); Taichi Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 223 days.

(21) Appl. No.: 15/696,569

(22) Filed: Sep. 6, 2017

(65) Prior Publication Data
US 2018/0121646 A1   May 3, 2018

(30) Foreign Application Priority Data

Nov. 1, 2016 (JP) ................................. 2016-214458
Feb. 22, 2017 (JP) ................................. 2017-031128
Jun. 23, 2017 (JP) ................................. 2017-122947

(51) Int. Cl.
*G06F 21/44* (2013.01)
*G06F 21/60* (2013.01)
*H04L 29/06* (2006.01)

(52) U.S. Cl.
CPC ............ *G06F 21/44* (2013.01); *G06F 21/608* (2013.01); *H04L 63/00* (2013.01); *G06F 2221/2115* (2013.01); *G06F 2221/2141* (2013.01)

(58) Field of Classification Search
CPC .................. G06F 21/44; G06F 21/608; G06F 2221/2115; G06F 2221/2141; H04L 63/00
See application file for complete search history.

(56) References Cited

U.S. PATENT DOCUMENTS 8,505,078 B2 * 8/2013 Hohlfeld ............. G06F 21/6218
726/5
9,208,332 B2 * 12/2015 Leach ..................... G06Q 10/06
(Continued)

FOREIGN PATENT DOCUMENTS

JP    2013-008106    1/2013
JP    2014-092823    5/2014

*Primary Examiner* — Yonas A Bayou
(74) *Attorney, Agent, or Firm* — IPUSA, PLLC

(57) ABSTRACT

There is provided an information processing device in which an application of an electronic device provides a service to a user, the information processing device including a processor; and a memory that includes instructions, which when executed, cause the processor to execute the following steps: associating the application with a processing flow; associating the processing flow with a scope of authorization of an external service; retrieving the scope of the authorization of the external service required by the processing flow associated with the application; retrieving authorized information representing a scope of authorization of the external service authorized by the user; and providing, for each external service, information indicating whether the external service is authorized, based on a result of comparing the scope of the authorization of the external service required by the processing flow with the scope of the authorization of the external service authorized by the user.

18 Claims, 33 Drawing Sheets

(56) References Cited

U.S. PATENT DOCUMENTS

| | | | |
|---|---|---|---|
| 9,288,213 B2 | 3/2016 | Seo et al. | |
| 2011/0154443 A1* | 6/2011 | Thakur | G06F 21/41 726/3 |
| 2012/0011358 A1* | 1/2012 | Masone | G06F 21/305 713/153 |
| 2012/0011571 A1* | 1/2012 | Moroney | H04N 21/43615 726/4 |
| 2012/0060031 A1* | 3/2012 | Huang | H04N 21/8355 713/168 |
| 2012/0109728 A1* | 5/2012 | Sparks | G06Q 30/0214 705/14.16 |
| 2012/0179802 A1* | 7/2012 | Narasimhan | H04L 41/046 709/223 |
| 2013/0031158 A1* | 1/2013 | Salsburg | G06F 9/5072 709/203 |
| 2013/0074066 A1* | 3/2013 | Sanzgiri | H04L 41/0893 718/1 |
| 2013/0198211 A1* | 8/2013 | Kohkaki | H03M 7/00 707/756 |
| 2013/0198806 A1* | 8/2013 | Takatsu | G06F 3/1238 726/3 |
| 2014/0123240 A1* | 5/2014 | Seo | H04L 63/104 726/4 |

* cited by examiner

FIG.10A

| id | app_01 |
|---|---|
| APPLICATION NAME | Scan to AAA |
| PROCESSING FLOW id | io_20 |
| PARAMETER CONFIGURATION | (OMITTED) |

FIG.10B

| id | app_02 |
|---|---|
| APPLICATION NAME | Print form AAA |
| PROCESSING FLOW id | io_21 |
| PARAMETER CONFIGURATION | (OMITTED) |

FIG.11A

| id | io_20 |
|---|---|
| PROCESSING FLOW NAME | AAA_postFile |
| SCOPE | [<br>  {<br>    "service": "AAA",<br>    "requiredScopes": [<br>      "https://www.AAAapis.com/auth/drive.file"<br>    ]<br>  }<br>] |

FIG.11B

| id | io_21 |
|---|---|
| PROCESSING FLOW NAME | AAA_getFile |
| SCOPE | [<br>  {<br>    "service": "AAA",<br>    "requiredScopes": [<br>      "https://www.AAAapis.com/auth/drive.readonly"<br>    ]<br>  }<br>] |

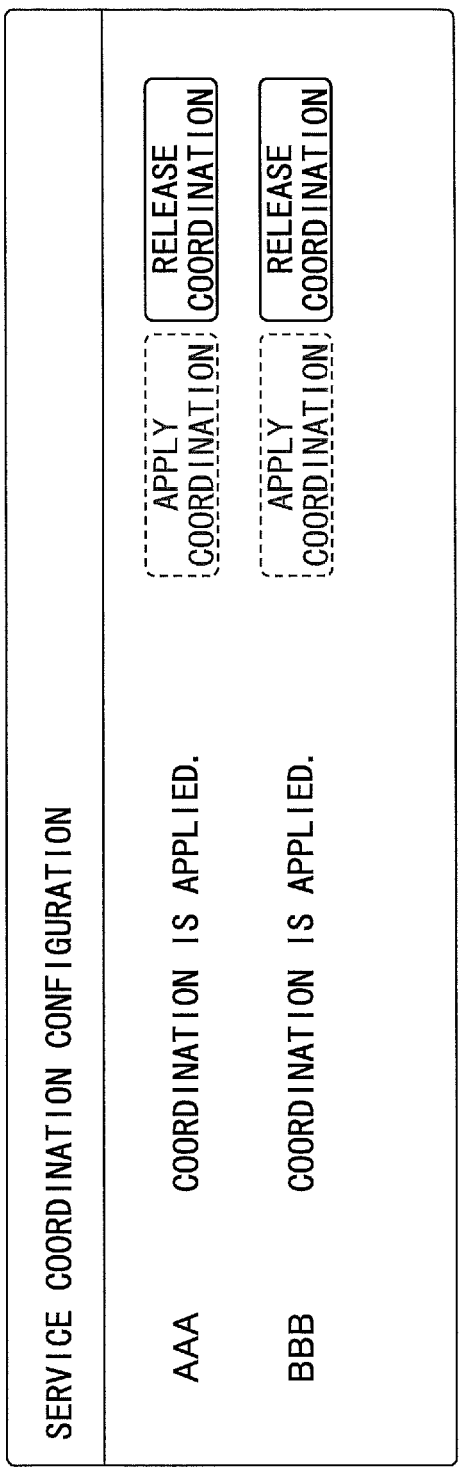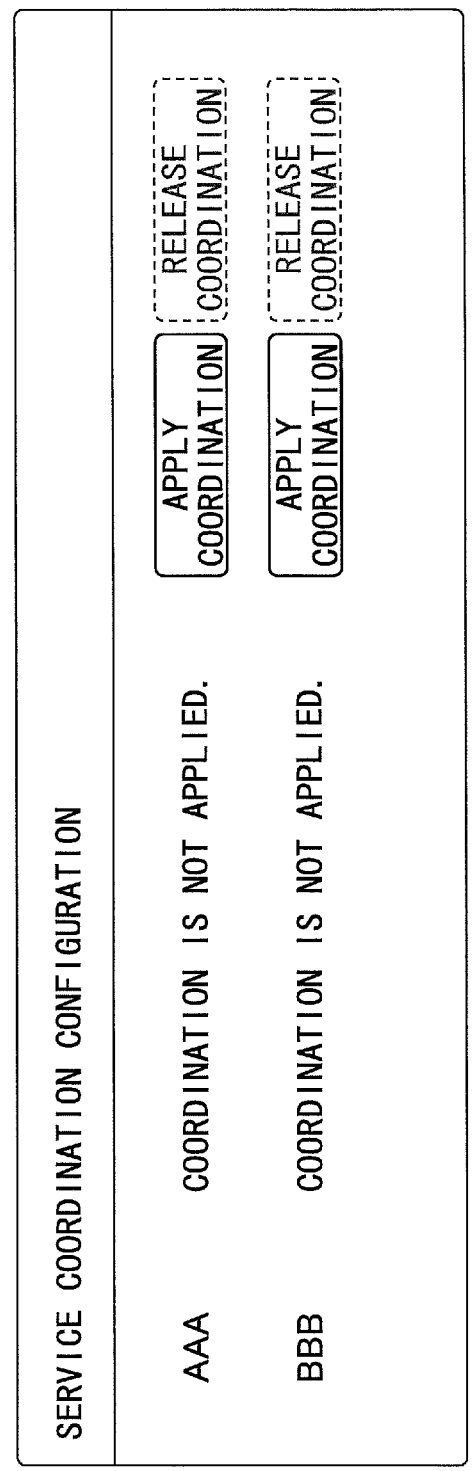

FIG.14

```
[
  {
    "service": "AAA",
    "requiredScopes": [
      "https://www.AAAapis.com/auth/drive.file",
      "https://www.AAAapis.com/auth/drive.readonly"

```
{
  "tenant_id": "sampleTenant",
  "user_id": "sampleUser",
  "name": "SAMPLE",
  "mail": "sampleUser@hoge.example.com",
  "oauth": [{
    "oauth_id": "aaaaaaa",
    "service": "AAA",
    "scope": [
      "https://www.AAAapis.com/auth/drive.readonly",
      "https://www.AAAapis.com/auth/drive.file"
    ],
    "delegator": null,
  }, {
    "oauth_id": "AAAAAAA",
    "sp_id": "BBB",
    "scope": [
      "AllSites.Write",
      "profile"
    ],
    "delegator": null,
  }]
}
```

FIG.16

```
{ .. OMITTED..
    "oauth": [[
        "oauth_id": "aaaaaaa",
        "service": "AAA",
        "scope": [
            "https://www.AAAapis.com/auth/drive.file"
        ],
        "delegator": null,
    },OMITTED
}
```

FIG.25

```
GET /v1/io/user/applications/proxies/ext_services?app_name
=remark HTTP/1.1

[
   {
      "serviceProviderId":"Remark",
      "displayName":"Remark",
      "parameters": {
         "appGroupId": null,
         "appUserId": {
            "displayName":"User ID"
         },
         "appPassword": {
            "displayName":"Password"
         }
      }
   }
]
```

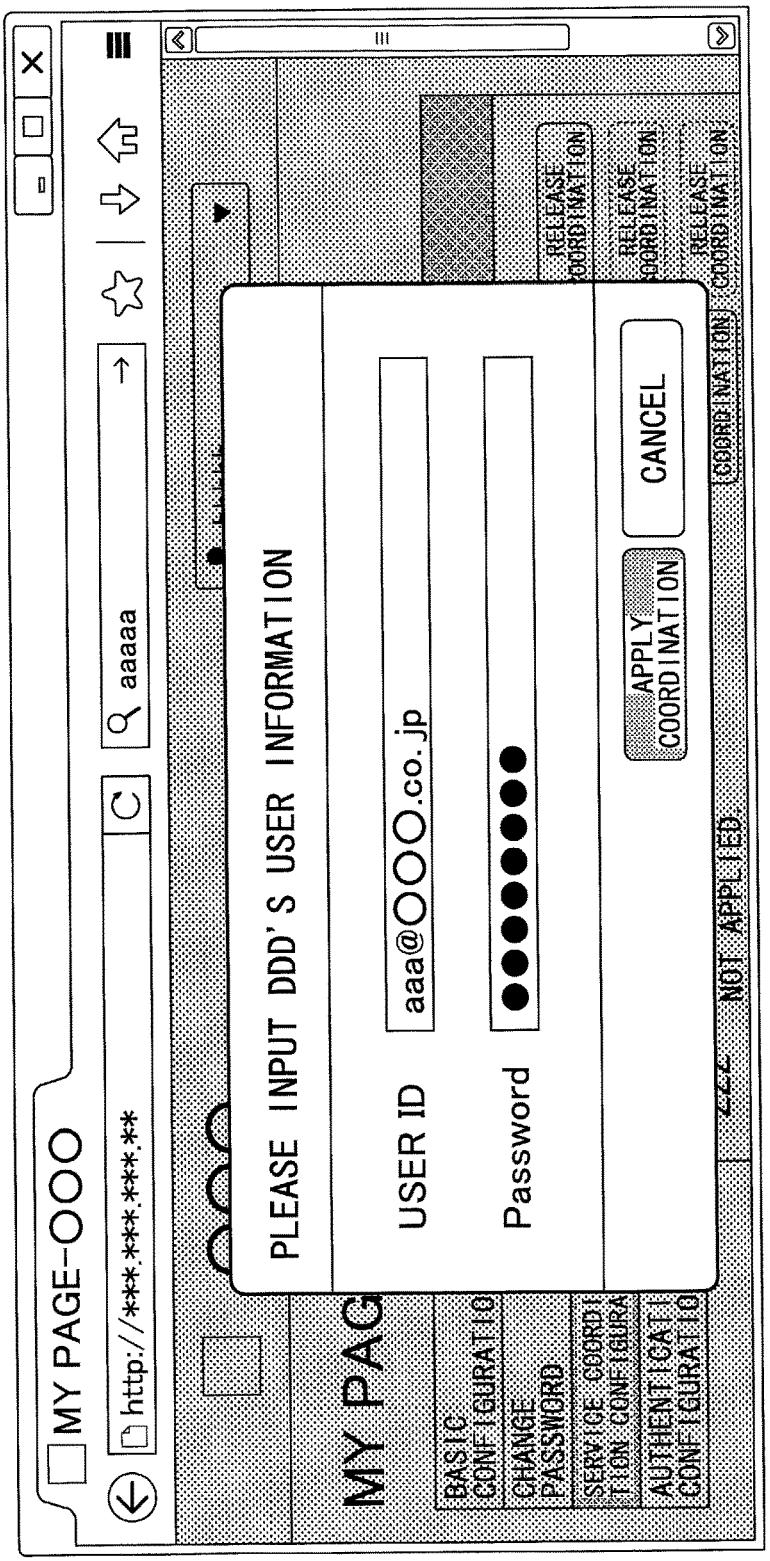

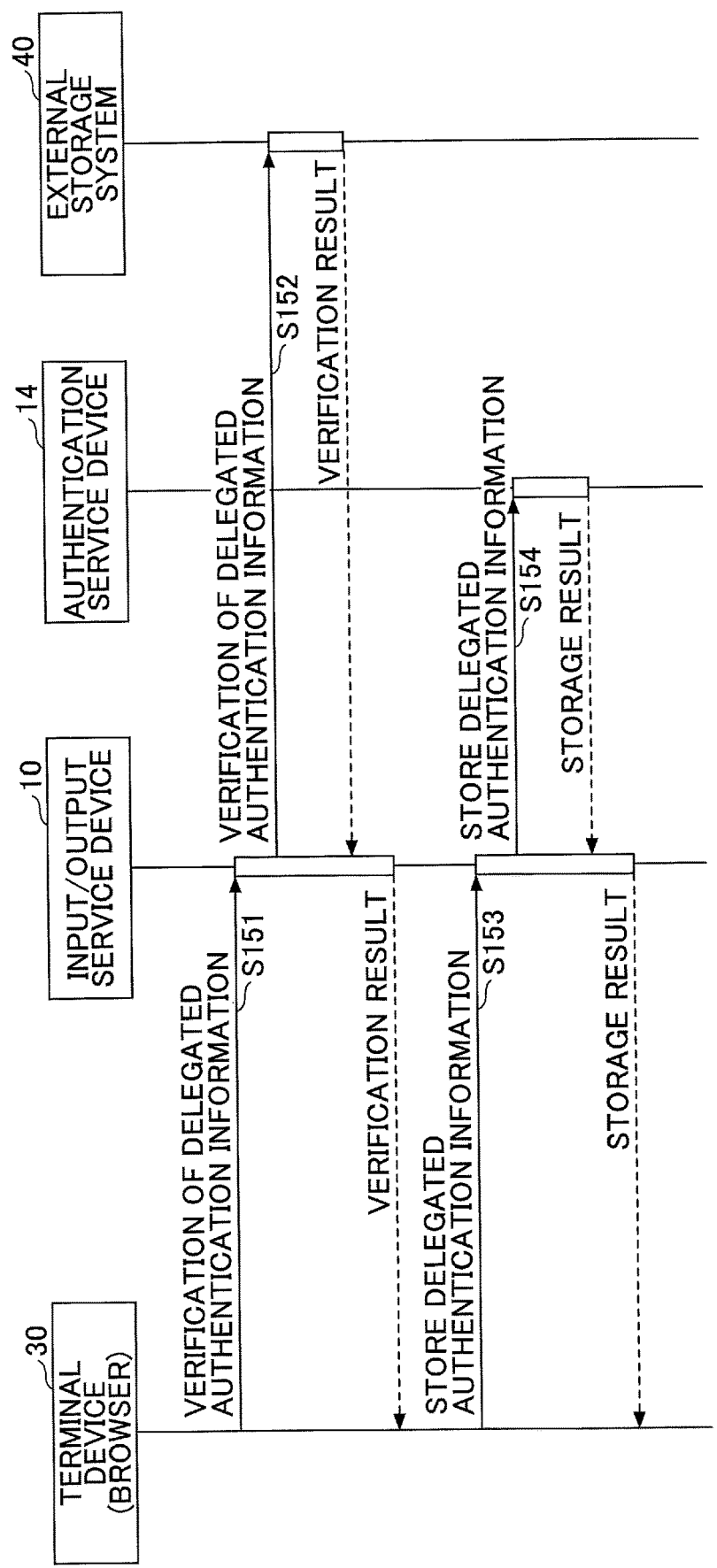

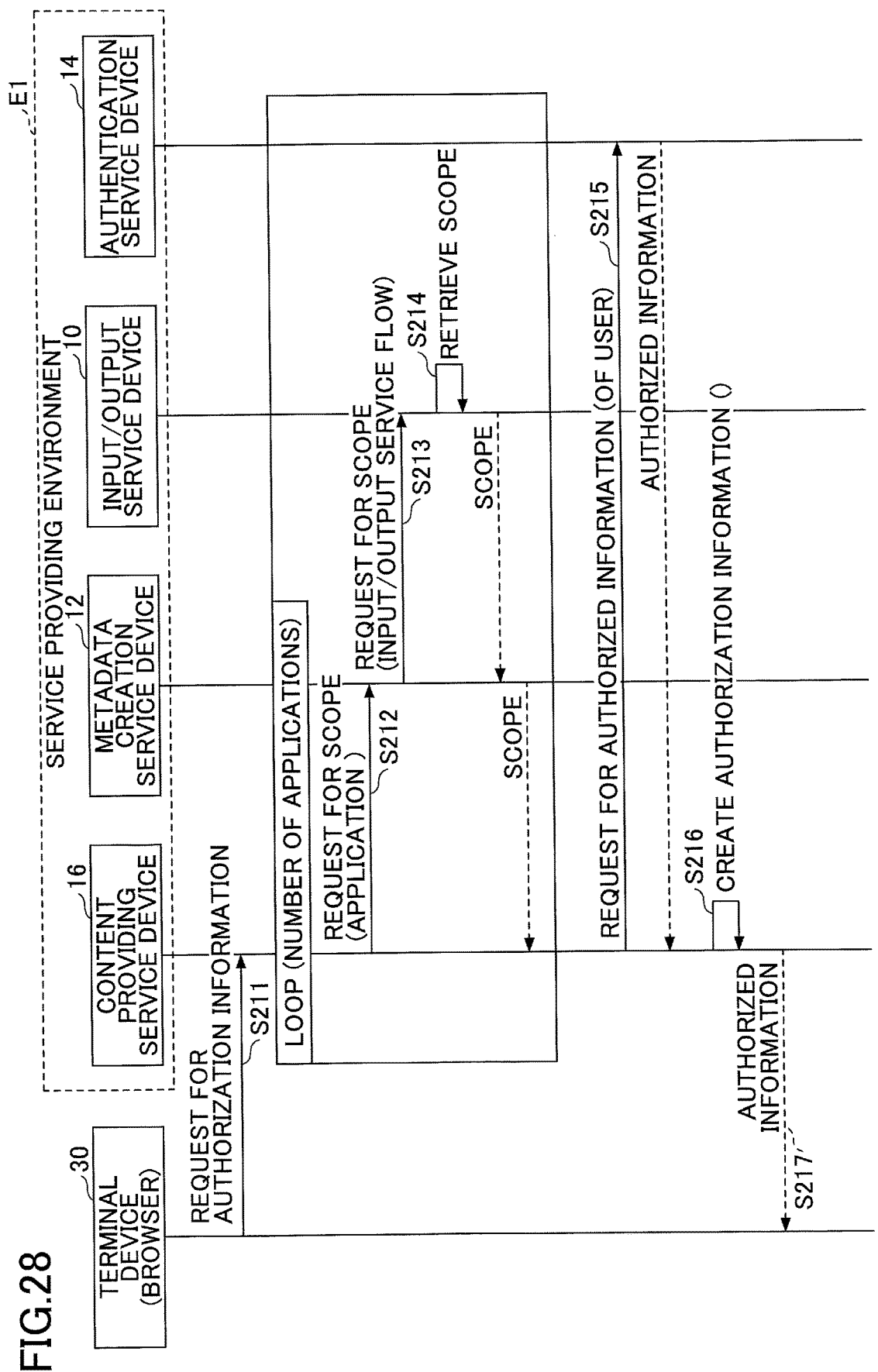

FIG.29

```
[
    {
        "service":"AAA",
        "requiredScopes": [
            "https://www.AAAapis.com/auth/drive.file"

]
    },
    {
        "service":"BBB",
        "requiredScopes": [
            "AllSites.Write"
        ]
    }
]
```

FIG.30

```
{
   "tenant_id":"sampleTenant",
   "user_id":"sampleUser",
   "name":"SAMPLE",
   "mail": "sampleUser@hoge.example.com",
   "oauth": [{
      "oauth_id":"aaaaaaa",
      "service":"AAA",
      "scope": [
         "https://www.AAAapis.com/auth/drive",
         "https://www.AAAapis.com/auth/drive.appfolder",
         "https://www.AAAapis.com/auth/drive.file",
         "openid",
         "profile"
      ],
      "delegator": null,
   }, {
      "oauth_id":"AAAAAAA",
      "service":"BBB",
      "scope": [
         "AllSites.Write",
         "profile"
      ],
      "delegator": null,
   }]
}
```

FIG.31

```
[
    {
        "serviceProviderId":"AAA",
        "requiredScopes":[
            "https://www.AAAapis.com/auth/drive",
            "https://www.AAAapis.com/auth/drive.file"
        ],
        "authorized":true,
        "scopes":[
            "https://www.AAAapis.com/auth/drive"
        ],
        "requiredAuthorize":true
    },
    {
        "serviceProviderId":"BBB",
        "requiredScopes":[
            "AllSites.Write",
            "profile"
        ],
        "authorized":true,
        "scopes":[
            "AllSites.Write",
            "profile"
        ],
        "requiredAuthorize": false
    }
]
```

FIG.33

```
{
    "serviceProviderId":"AAA"
    ,"requiredScopes":[
        "https://www.AAAapis.com/auth/drive",
        "https://www.AAAapis.com/auth/drive.file"
    ]
    ,"authorized":true
    ,"scopes":[
        "https://www.AAAapis.com/auth/drive"
    ]
    ,"requiredAuthorize":true
}
```

FIG.34A

```
{
    "appInstanceId":"126001",
    " authMode":"tenant",
    "appInstanceName","Scan to Storages"
}
```

FIG.34B

UPDATE OF SERVICE COORDINATION
CONFIGURATION IS REQUIRED.
PLEASE CONTACT AN ADMINISTRATOR.

[RETURN TO HOME]

FIG.34C

UPDATE OF SERVICE COORDINATION
CONFIGURATION IS REQUIRED.
PLEASE VISIT THE SITE AND UPDATE
THE CONFIGURATION.

[RETURN TO HOME]

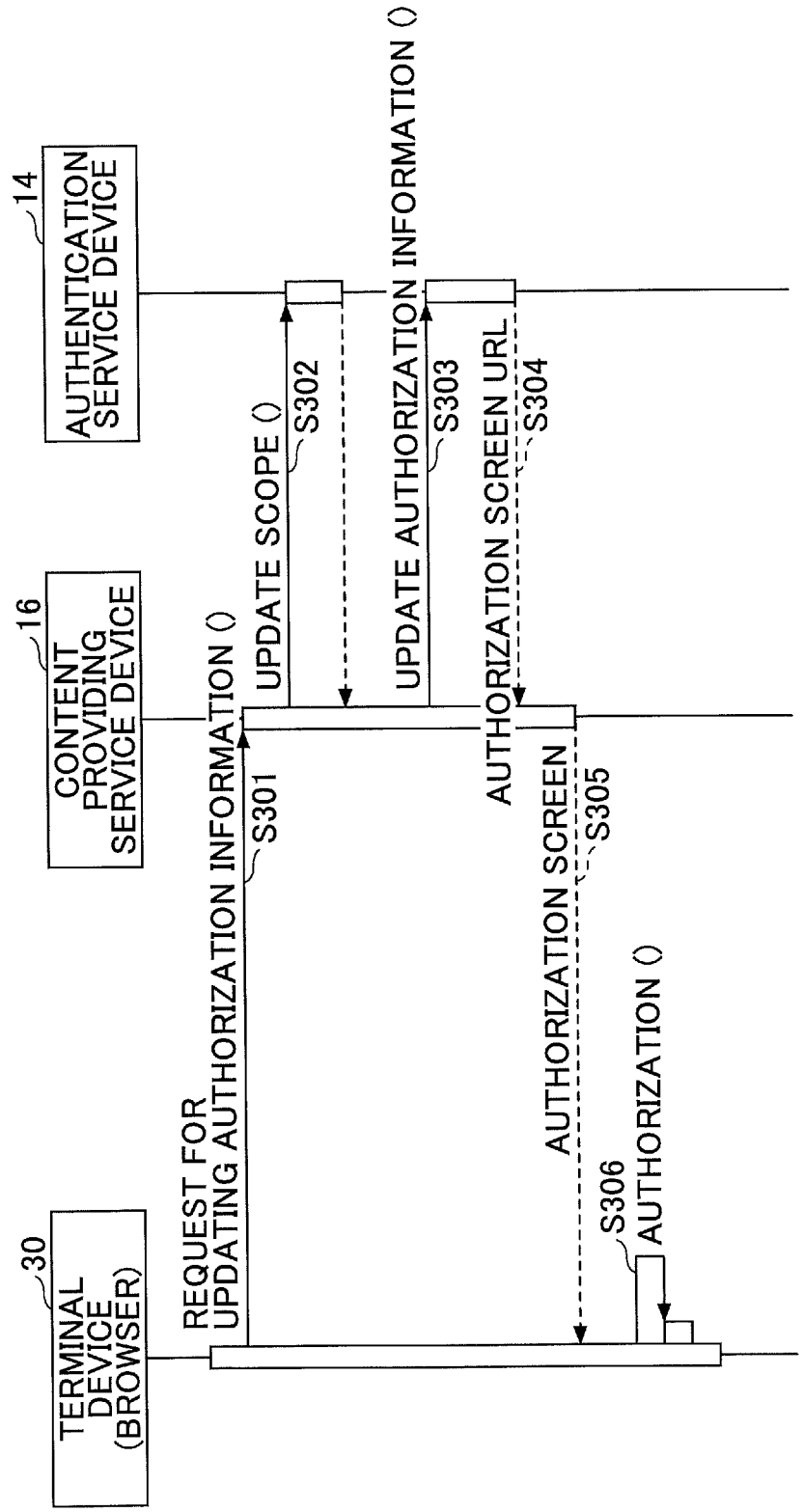

# INFORMATION PROCESSING DEVICE, INFORMATION PROCESSING SYSTEM, AND INFORMATION PROCESSING METHOD

BACKGROUND OF THE INVENTION

1. Field of the Invention

The present disclosure relates to an information processing device, an information processing system, and an information processing method.

2. Description of the Related Art

A service has been known in which a document input/output device, such as a multifunction peripheral (MFP), and a service on a cloud are coordinated (which is referred to as a device coordination service, hereinafter). As for coordination with an external cloud service, a mechanism has been known that allows a user to authorize necessary scope, such as OAuth authentication.

For example, in an application in which a plurality of services is to be coordinated, when one service is to receive provision of other services according to the authority delegated by a user, an authorization procedure is to be performed for each of the other services (cf. Patent Document 1 (Japanese Unexamined Patent Publication No. 2014-92823), for example).

For example, when a user desires to use an application provided by a device coordination service, the user is required to authorize a scope of an external cloud service required by the application. Thus, when a user is to use a plurality of applications provided by a device coordination service, and when a scope required by one of the applications differs from a scope required by another one of the applications, the user is required to authorize the scope of each application, which can be a burden on the user.

There is a need for an information processing device that can reduce a burden on a user for performing an authorization procedure.

SUMMARY OF THE INVENTION

According to an aspect of the present invention, there is provided an information processing device in which an application of a service coordinated with an electronic device of a user environment provides the service to a user operating the electronic device, the information processing device including a processor; and a memory that includes instructions, which when executed, cause the processor to execute the following steps: associating the application with a processing flow invoked by the application and storing the application and the associated processing flow in the memory; associating the processing flow with a scope of authorization of one or more external services required by the processing flow and storing the processing flow and the associated scope of the authorization of the one or more external services required by the processing flow in the memory; retrieving, from the memory, the scope of the authorization of the one or more external services required by the processing flow that is associated with the application capable of being used by the user; retrieving authorized information representing a scope of authorization of the one or more external services authorized by the user; and providing, for each external service of the one or more external services, information indicating whether the external service is authorized, based on a result of comparing the scope of the authorization of the one or more external services required by the retrieved processing flow with the scope of the authorization of the one or more external services authorized by the user.

According to another aspect of the present disclosure, there is provided an information processing system including one or more information processing devices in which an application of a service coordinated with an electronic device of a user environment provides the service to a user operating the electronic device, the information processing system including a processor; and a memory that includes instructions, which when executed, cause the processor to execute the following steps: associating the application with a processing flow invoked by the application and storing the application and the associated processing flow in the memory; associating the processing flow with a scope of authorization of external services required by the processing flow and storing the processing flow and the associated scope of the authorization of the one or more external services required by the processing flow in the memory; retrieving, from the memory, the scope of the authorization of the one or more external services required by the processing flow that is associated with the application capable of being used by the user; retrieving authorized information representing a scope of authorization of the one or more external services authorized by the user; and providing, for each external service of the one or more external services, information indicating whether the external service is authorized, based on a result of comparing the scope of the authorization of the one or more external services required by the retrieved processing flow with the scope of the authorization of the one or more external services authorized by the user.

According to another aspect of the present disclosure, there is provided an information processing method executed by an information processing device in which an application of a service coordinated with an electronic device of a user environment provides the service to a user operating the electronic device, the information processing method including associating the application with a processing flow invoked by the application and storing the application and the associated processing flow in a memory of the information processing device; associating the processing flow with a scope of authorization of one or more external services required by the processing flow and storing the processing flow and the associated scope of the authorization of the one or more external services required by the processing flow in the memory; retrieving, from the memory, the scope of the authorization of the one or more external services required by the processing flow that is associated with the application capable of being used by the user; retrieving authorized information representing a scope of authorization of one or more external services authorized by the user; and providing, for each external service of the one or more external services, information indicating whether the external service is authorized, based on a result of comparing the scope of the authorization of the one or more external services required by the retrieved processing flow with the scope of the authorization of the one or more external services authorized by the user.

According to an embodiment of the present disclosure, a burden on a user for performing an authorization procedure can be reduced.

Other objects, features and advantages of the present invention will become more apparent from the following detailed description when read in conjunction with the accompanying drawings.

BRIEF DESCRIPTION OF THE DRAWINGS

FIG. 10A is a diagram illustrating an example of a configuration of application/processing flow association information;

FIG. 10B is a diagram illustrating another example of the configuration of the application/processing flow association information;

FIG. 11A is a diagram illustrating an example of a configuration of processing flow/scope association information;

FIG. 11B is a diagram illustrating another example of the configuration of the processing flow/scope association information;

FIG. 12A is a diagram illustrating an example of a service coordination configuration screen;

FIG. 12B is a diagram illustrating another example of the service coordination configuration screen;

FIG. 14 is a diagram illustrating a configuration of an example of a merged scope;

FIG. 15 is a diagram illustrating a configuration of an example of authorized information returned from an authentication service device;

FIG. 16 is a diagram illustrating a configuration of another example of the authorized information returned from the authentication service device;

FIG. 25 is a diagram illustrating a configuration of an example of the delegated authentication information;

FIG. 26B is a diagram illustrating the example of the service coordination configuration screen;

FIG. 27 is a sequence diagram of an example of a delegated authentication information configuration process;

FIG. 28 is a sequence diagram of an example of the process of collectively retrieving authorization information;

FIG. 29 is a diagram of a configuration of an example of the merged scope;

FIG. 30 is a diagram of a configuration of an example of the authorized information returned from the authentication service device;

FIG. 31 is a diagram of a configuration of an example of the authorized information returned from the content providing service device;

FIG. 33 is a diagram illustrating a configuration of an example of the authorization information returned to an application on a browser of an image forming apparatus when an external storage service is specified;

FIG. 34A is a diagram illustrating an example of information held by the application;

FIG. 34B is a diagram illustrating an example of an authorization information update notification screen;

FIG. 34C is a diagram illustrating the example of the authorization information update notification screen; and FIG. 35 is a sequence diagram of an example of an authorization information update process.

DETAILED DESCRIPTION OF THE PREFERRED EMBODIMENTS

In the following, embodiments of the present disclosure are described in detail by referring to the accompanying drawings.

First Embodiment

<System Configuration>

Figure 1:
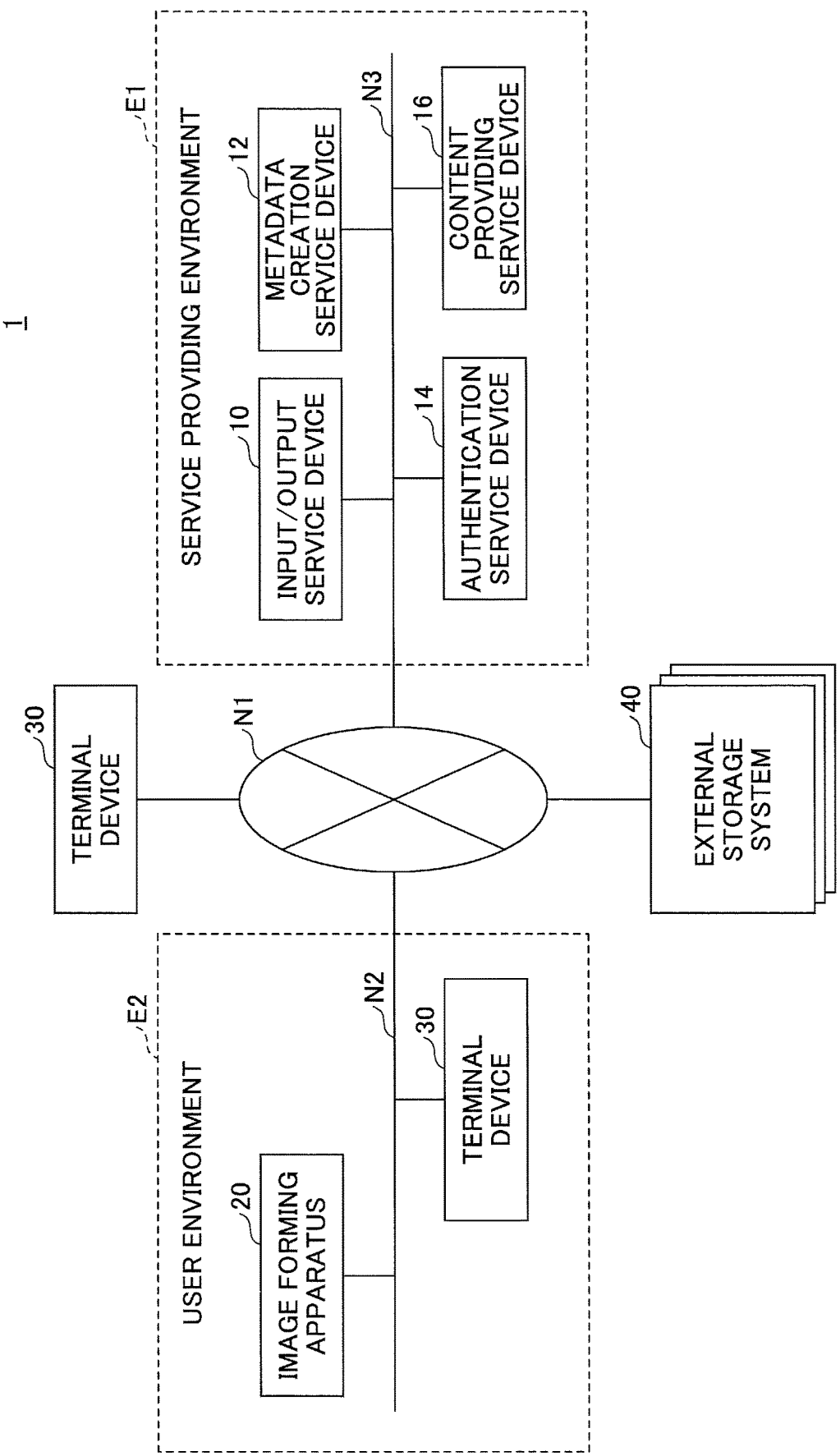
FIG. 1 is an example of a configuration diagram of an information processing system according to an embodiment.

FIG. 1 is a configuration diagram of an example of an information processing system according to an embodiment. The information processing system 1 illustrated in FIG. 1 includes a service providing environment E1, a user environment E2, and an external storage system 40. The service providing environment E1, the user environment E2, and the external storage system 40 are coupled to each other through a wide area network N1, such as the Internet. Accordingly, the service providing environment E1, the user environment E2, and the external storage system 40 can mutually communicate.

The service providing environment E1 is a system environment for providing a service, such as a cloud service, through the network N1. The embodiment is described by adopting a cloud service, as an example of the service. However, the service is not limited to the cloud service, and the service may be a service provided by an Application Service Provider (ASP) or a Web service.

In the service providing environment E1 of FIG. 1, an input/output service device 10, a metadata creation service device 12, an authentication service device 14, and a content providing service device 16 are coupled to each other through a network N3, such as a local area network (LAN).

The input/output service device 10 provides, in a device coordination service, a service with a function for absorbing differences among unique functions of a plurality of external storage systems (such as functions for adding bibliographic information), a function of optical character recognition (OCR) processing, and a function of file conversion. The service provided by the input/output service device 10 can be implemented by coordinating an application of the input/output service device 10 and an image forming apparatus 20 in the user environment E2.

For example, the input/output service device 10 may provide a service for storing, in the external storage system 40, an electronic file created by scanning a document by the image forming apparatus 20 in the user environment E2 (a scan delivery service).

The metadata creation service device 12 provides a service for defining metadata for creating data, which can be a request to the input/output service device 10. The metadata may be defined by a developer of an application. The metadata creation service device 12 may also define information about which processing flow of the input/output service device 10 is to be invoked by the application.

The authentication service device 14 provides a service with an authentication function for coordinating with the external storage system 40 and a function for maintaining user information. The content providing service device 16 is a server computer for storing and running a service program for providing an application to a user. Note that the application can be a Web application that operates in the user environment E2.

The service providing environment E1 is implemented by one or more information processing devices. All or a part of the input/output service device 10, the metadata creation service device 12, the authentication service device 14, and the content providing service device 16 of the service providing environment E1 may be installed in the user environment E2. Namely, all or a part of the information processing devices forming the service providing environment E1 may be included in the user environment E2.

The user environment E2 is a system environment of a company, which can be a user who uses the image forming apparatus 20. In the user environment E2, the image forming apparatus 20 and a terminal device 30 are coupled to each other through a network N2, such as a LAN.

The image forming apparatus 20 is an example of an electronic device operated by a user. The image forming apparatus 20 may be an electronic device, such as a multifunction peripheral, a copier, a scanner, a printer, a laser printer, a projector, or an electronic blackboard. The image forming apparatus 20 is provided with a function, such as a scanning function, a printing function, a copying function, or a facsimile communication function. The terminal device 30 is an operation terminal that is operated by a user, such as a smartphone, a mobile telephone, or a personal computer (PC), on which a generic operating system (OS) is installed.

The external storage system 40 is a computer system for providing a cloud service, which is referred to as a storage service (or online storage), through the network N1. The storage service is a service to lend a storage area of storage of the external storage system 40. Note that the external storage system 40 may be a system implemented by a plurality of information processing devices.

The configuration of the information processing system 1 of FIG. 1 is merely an example, and the configuration of the information processing system 1 may be a different configuration. For example, a plurality of image forming apparatuses 20 may be included in the information processing system 1. Furthermore, the terminal device 30 may be coupled to the network N1.

<Hardware Configuration>
<<Computer>>

Figure 2:
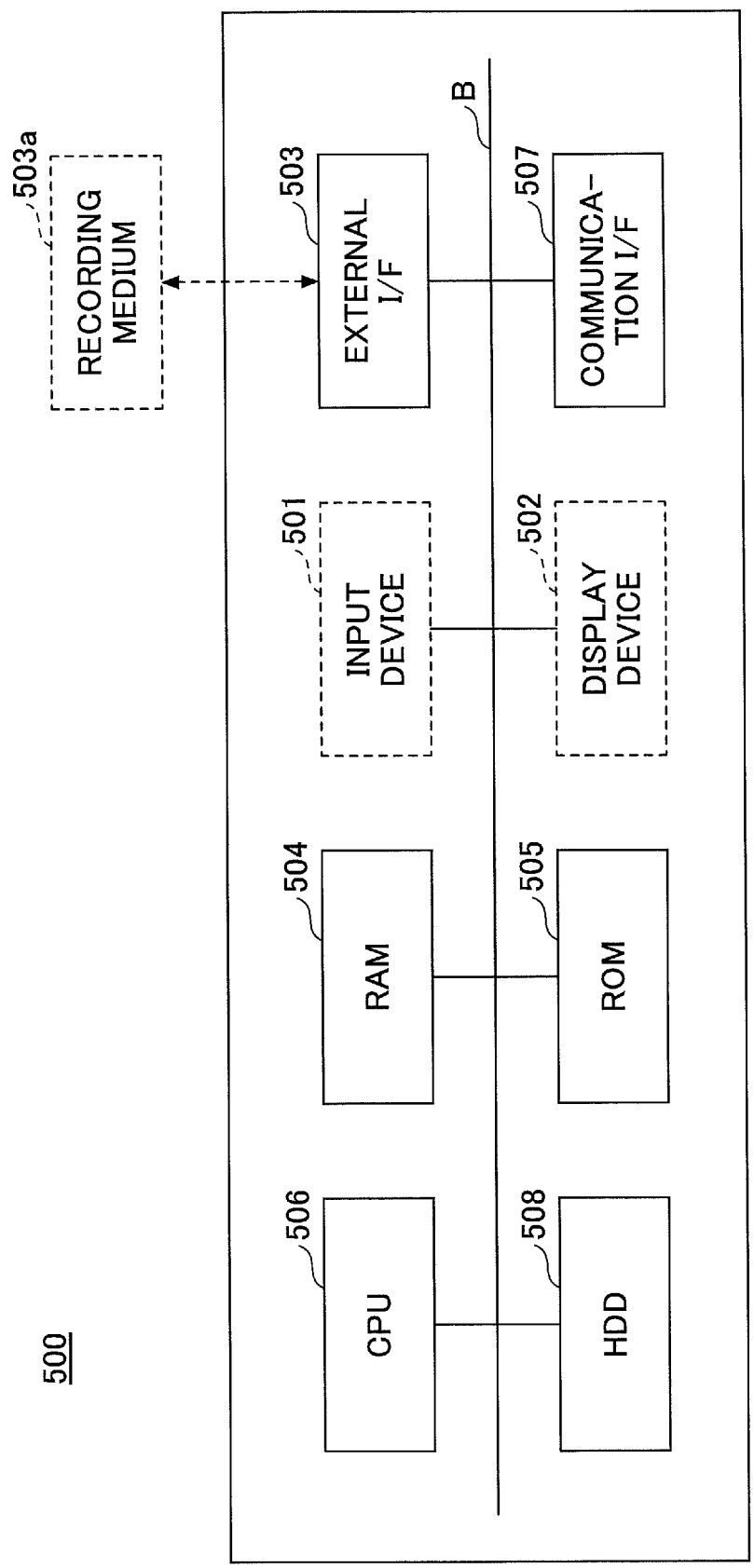
FIG. 2 is a hardware configuration diagram of an example of a computer.

Each of the one or more information processing devices that implement the input/output service device 10, the metadata creation service device 12, the authentication service device 14, and the content providing service device 16 of FIG. 1 can be a computer provided with a hardware configuration illustrated in FIG. 2. Additionally, each of the one or more information processing devices that implement the external storage system 40 can be a computer provided with the hardware configuration illustrated in FIG. 2. Furthermore, the terminal device 30 of FIG. 1 can be a computer provided with the hardware configuration illustrated in FIG. 2.

FIG. 2 is a diagram illustrating a hardware configuration of an example of a computer. The computer 500 of FIG. 2 includes an input device 501; a display device 502, an external interface (I/F) 503; a random access memory (RAM) 504; a read-only memory (ROM) 505; a central processing unit (CPU) 506; a communication I/F 507; and a hard disk drive (HDD) 508, which are coupled to each other through a bus B. Note that the input device 501 and the display device 502 may be detachable devices. In this case, when it is necessary to use the input device 501 and the display device 502, the input device 501 and the display device 502 can be coupled to the computer 500.

The input device 501 includes a keyboard, a mouse, and a touch panel. The input device 501 can be used by a user to input operational signals. The display device 502 includes a display. The display device 502 displays a processing result by the computer 500.

The communication I/F 507 is an interface for coupling the computer 500 to various types of networks. The computer 500 is capable of executing data communication through the communication I/F 507.

The HDD 508 is an example of a non-volatile storage device for storing a program and data. As examples of the program and the data stored in the HDD 508, there are an operating system (OS), which is a system software for controlling the computer 500 as a whole, and applications that provide various types of functions on the OS. Here, instead of the HDD 508, the computer 500 may adopt a drive device (e.g., a solid state drive: SSD) that utilizes a flash memory, as a storage medium.

The external I/F 503 is an interface with an external device. A recording medium 503a can be an example of the external device. The computer 500 is capable of reading out data from and writing data in the recording medium 503a through the external I/F 503. The recording medium 503a may be, for example, a flexible disk, a compact disc (CD), a digital versatile disk (DVD), a Secure Digital (SD) memory card, or a universal serial bus (USB) memory.

The ROM 505 is an example of a non-volatile semiconductor memory (storage device) that can maintain a program and data, even if a power supply is tuned off. The ROM 505 stores a program and data, such as a basic input/output system (BIOS), which is executed during activation of the computer 500, a configuration of the OS, and a network configuration. The RAM 504 is an example of a volatile semiconductor memory (storage device) that temporarily stores a program and data.

The CPU 506 is a processor that reads out a program and data from a storage device, such as the ROM 505 and the HDD 508, onto the RAM 504. The CPU 506 executes a process in accordance with the program and the data so as to control the entire computer 500 and to implement functions of the computer 500.

By the hardware configuration of the computer 500 illustrated in FIG. 2, the input/output service device 10, the metadata creation service 12, the authentication service device 14, and the content providing service device 16 can implement various types of processes, which are described below. Additionally, by the hardware configuration of the computer 500 illustrated in FIG. 2, the one or more information processing devices that implement the external storage system 40 and the terminal device 30 can implement various types of processes, which are described below.

<<Multifunction Peripheral>>

Figure 3:
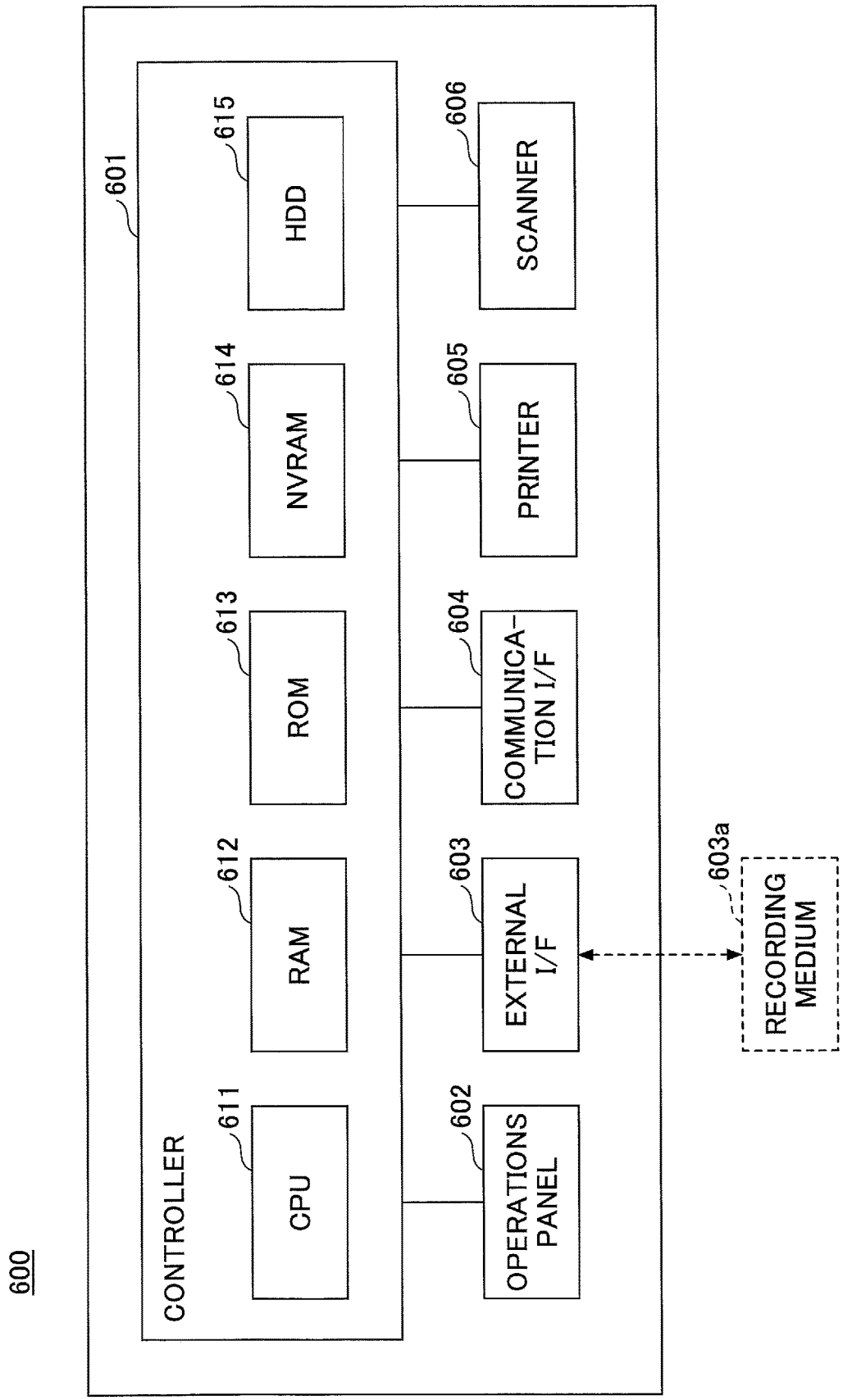
FIG. 3 is a hardware configuration diagram of an example of a multifunction peripheral.

A multifunction peripheral 600, which is an example of the image forming apparatus 20 of FIG. 1, can be implemented, for example, by a computer with a hardware configuration illustrated in FIG. 3. FIG. 3 is a hardware configuration diagram of an example of the multifunction peripheral 600. The multifunction peripheral 600 of FIG. 3 includes a controller 601; an operations panel 602; an external I/F 603; a communication I/F 604; a printer 605; and a scanner 606.

The controller 601 includes a CPU 611; a RAM 612; a ROM 613; a non-volatile random access memory (NVRAM) 614; and a HDD 615. The ROM 613 stores various types of programs and data. The RAM 612 temporarily stores a program and data. The NVRAM 614 stores configuration information, for example. The HDD 615 stores various types of programs and data.

The CPU 611 reads out a program, data, and configuration information from a storage device, such as the ROM 613, the NVRAM 614, and the HDD 615, onto the RAM 612. The CPU 506 executes a process in accordance with the program, the data, and the configuration information so as to control the entire multifunction peripheral 600 and to implement functions of the multifunction peripheral 600.

The operations panel 602 includes an input unit for receiving an input from a user and a display unit for displaying. The external I/F 603 is an interface with an external device. A recording medium 603a can be an example of the external device. The multifunction peripheral 600 is capable of reading out data from and writing data in the recording medium 603a through the external I/F 603. The recording medium 603a may be, for example, an integrated circuit (IC) card, a flexible disk, a CD, a DVD, a SD memory card, or a USB memory.

The communication I/F 604 is an interface for coupling the multifunction peripheral 600 to the network N2. The multifunction peripheral 600 is capable of executing data communication through the communication I/F 604. The printer 605 is a printing device for printing print data onto a conveyed object. The conveyed object may be, for example, paper, coated paper, cardboard, an overhead projector (OHP) sheet, a plastic film, prepreg, or copper foil. The conveyed object is not limited to paper. The scanner 606 is a reading device for reading image data (electronic data) on a document.

By the above-described hardware configuration, the multifunction peripheral 600 can implement various types of processes, which are described below.

<Software Configuration>

The input/output service device 10, the metadata creation service device 12, the authentication service device 14, the content providing service device 16, and the terminal device 30 of the information processing system 1 according to the embodiment can be implemented, for example, by processing blocks, which are described below. Note that, in the following description, processing blocks that are not relevant to the description of the embodiment are omitted.

<<Input/Output Service Device>>

Figure 4:
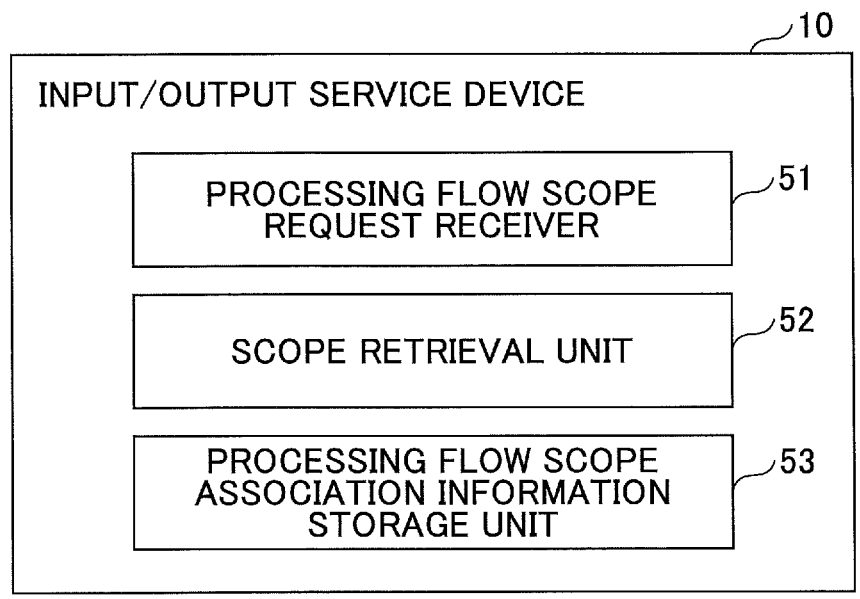
FIG. 4 is a diagram illustrating processing blocks of an example of an input/output service device according to the embodiment.

FIG. 4 is a diagram illustrating processing blocks of an example of the input/output service device 10 according to the embodiment. The input/output service device 10 of FIG. 4 includes a processing flow scope request receiver 51; a scope retrieval unit 52; and a processing flow scope association information storage unit 53.

The processing flow scope request receiver 51 receives, from the metadata creation service device 12, a scope request specifying an input/output service flow (processing flow), and the processing flow scope request receiver 51 returns a scope (authorization for using the external storage system 40) associated with the processing flow. The scope retrieval unit 52 retrieves the scope associated with the processing flow from the processing flow scope association information storage unit 53. The processing flow scope association information storage unit 53 stores the processing flow and the associated scope.

<<Metadata Creation Service Device>>

Figure 5:
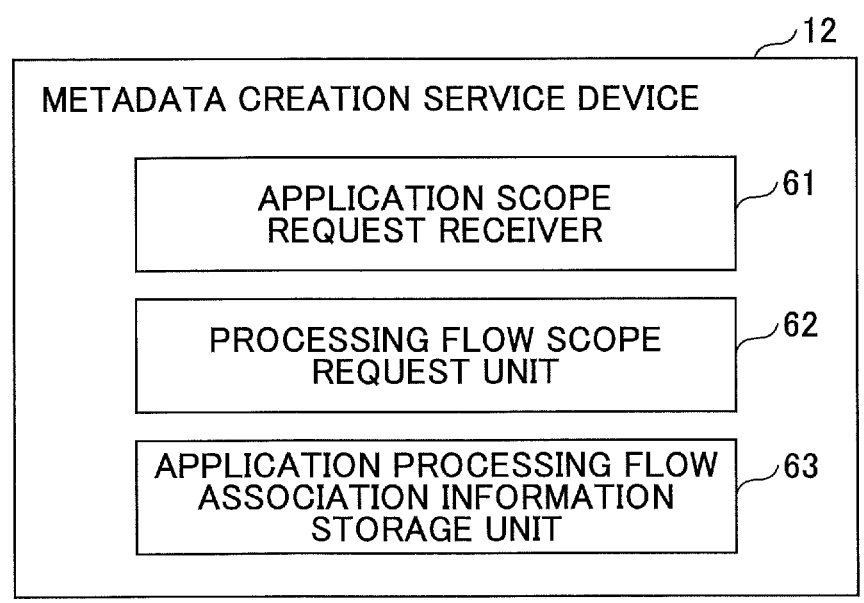
FIG. 5 is a diagram illustrating processing blocks of an example of a metadata creation service device according to the embodiment.

FIG. 5 is a diagram illustrating processing blocks of an example of the metadata creation service device 12 according to the embodiment. The metadata creation service device 12 of FIG. 5 includes an application scope request receiver 61; a processing flow scope request unit 62; and an application processing flow association information storage unit 63.

The application scope request receiver 61 receives a scope request specifying an application from the content providing service device 16, and the application scope request receiver 61 returns a scope that is required for using the application. The processing flow scope request unit 62 retrieves, from the application processing flow association information storage unit 63, a processing flow associated with the application specified in the scope request received from the content providing service device 16.

Then, the processing flow scope request unit 62 requests a scope from the input/output service device 10 while specifying a processing flow associated with the application specified in the scope request received from the content providing service device 16, and the processing flow scope request unit 62 obtains the scope. The application processing flow association information storage unit 63 stores the application and the associated processing flow.

<<Authentication Service Device>>

Figure 6:
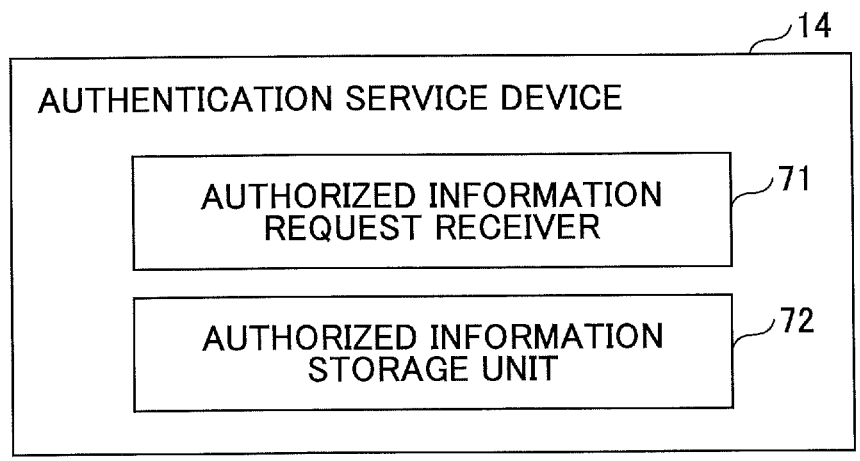
FIG. 6 is a diagram illustrating processing blocks of an example of an authentication service device according to the embodiment.

FIG. 6 is a diagram illustrating processing blocks of an example of the authentication service device 14 according to the embodiment. The authentication service device 14 of FIG. 6 includes an authorized information request receiver 71 and an authorized information storage unit 72.

The authorized information request receiver 71 receives an authorized information retrieval request that specifies a user from the content providing service device 16, and the authorized information request receiver 71 returns the authorized information associated with the user information. The authorized information storage unit 72 stores the user information and the associated authorized information.

<<Content Providing Service Device>>

Figure 7:
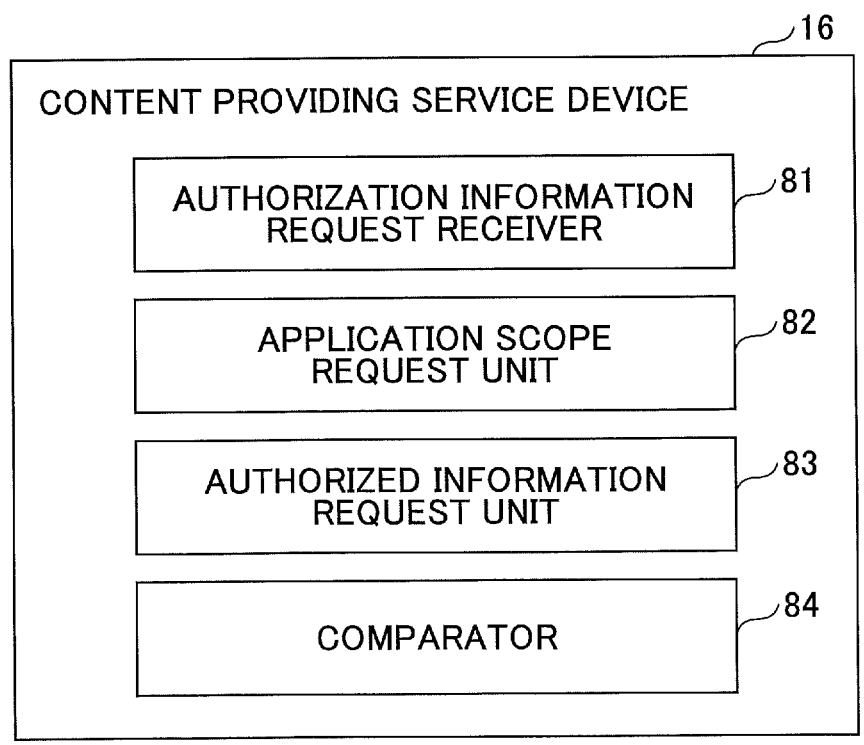
FIG. 7 is a diagram illustrating processing blocks of an example of a content providing service device according to the embodiment.

FIG. 7 is a diagram illustrating processing blocks of an example of the content providing service device 16 according to the embodiment. The content providing service device 16 of FIG. 7 includes an authorization information request receiver 81; an application scope request unit 82; an authorized information request unit 83; and a comparator 84.

The authorization information request receiver 81 receives an authorization information request from the terminal device 30, and the authorization information request receiver 81 returns authorization information for a user operating the terminal device 30. The application scope request unit 82 requests a scope for all installed applications from the metadata creation service device 12, and the application scope request unit 82 obtains the scope. The authorized information request unit 83 requests authorized information for a user operating the terminal device 30 from the authentication service device 14, and the authorized information request unit 83 obtains the authorized information for the user. The comparator 84 obtains, as the authorized information, a result obtained by comparing the scope for all the installed applications with the authorized information of the user.

<<Terminal Device>>

Figure 8:
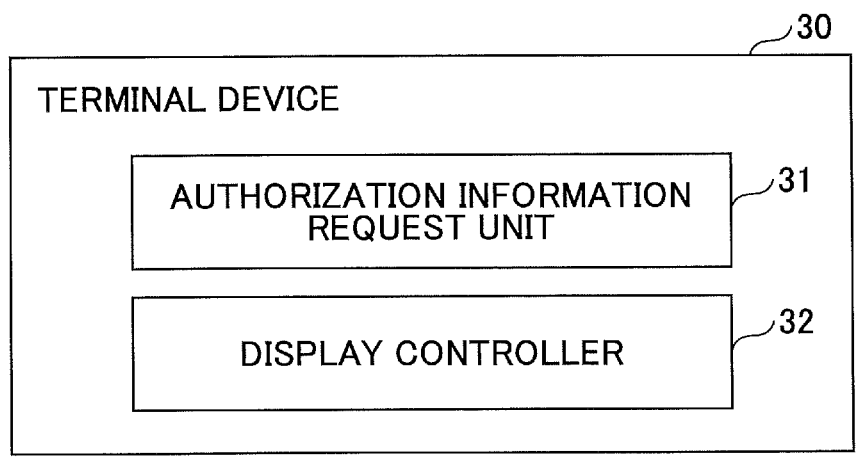
FIG. 8 is a diagram illustrating processing blocks of an example of a terminal device according to the embodiment.

FIG. 8 is a diagram illustrating processing blocks of an example of the terminal device 30 according to the embodiment. A browser is installed in the terminal device 30. The terminal device 30 of FIG. 8 implements an authorization information request unit 31 and a display controller 32 by executing a client application on the browser. The authorization information request unit 31 requests authorization information from the content providing service device 16, and the authorization information request unit 31 obtains the authorization information. The display controller 32 displays, based on the obtained authorization information, a service coordination configuration screen, which is described below.

<<Image Forming Apparatus>>

A browser is installed in the image forming apparatus 20. A user of the image forming apparatus 20 can use a service provided by the service providing environment E1 through the browser. The browser installed in the image forming apparatus 20 can access the service providing environment E1, and the browser can display a Web content retrieved from the service providing environment E1.

<Details of the Process>

Next, details of the process by the information processing system 1 according to the embodiment are described.

<<Process of Collectively Retrieving Authorization Information>>

Figure 9:
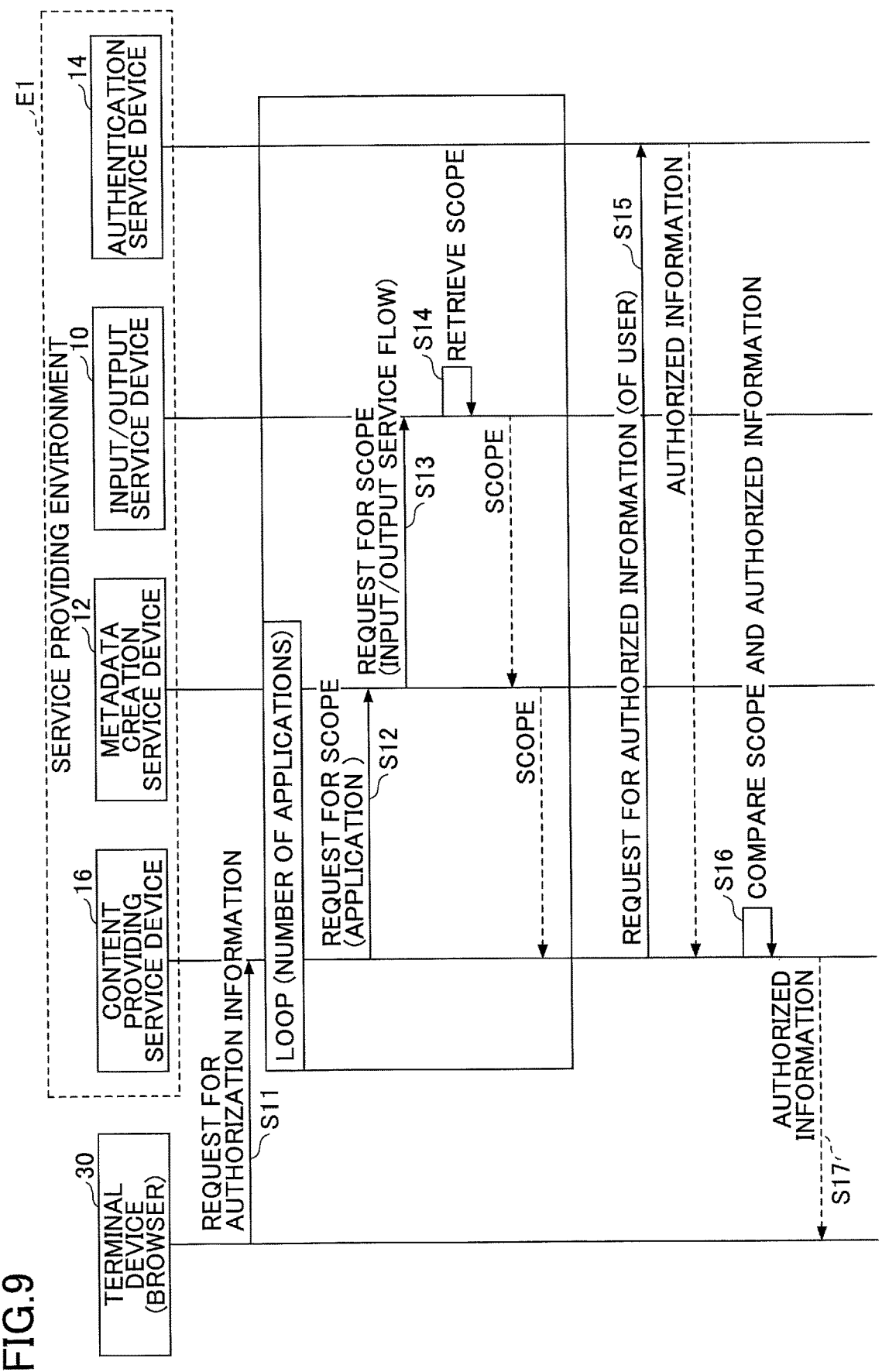
FIG. 9 is a sequence diagram of an example of a process of collectively retrieving authorization information.

FIG. 9 is a sequence diagram of an example of a process of collectively retrieving authorization information. At step S11, the terminal device 30 requests authorization information from the content providing service device 16. This request is transmitted, for example, upon accessing, from the browser of the terminal device 30, the service coordination configuration screen, which is described below.

Upon receiving the request for the authorization information, the content providing service device 16 retrieves a scope of all the installed applications. In the sequence diagram of FIG. 9, by repeating the process from step S12 to step S14 by a number of times that is equal to the number of the installed applications, the scope of all the installed applications is obtained.

At step S12, the content providing service device 16 requests a scope from the metadata creation service device 12 while specifying the application. The metadata creation service device 12 that receives the request for the scope that specifies the application refers to, for example, information that associates the application with the processing flow (application/processing flow association information), which is illustrated in FIG. 10.

FIGS. 10A and 10B are diagrams illustrating examples of configurations of the application/processing flow association information. The application/processing flow association information illustrated in each of FIGS. 10A and 10B includes, as information items, an identification (id); an application name; a processing flow id; and a parameter configuration. The application/processing flow association information of each of FIGS. 10A and 10B associates an application with a processing flow by the id that uniquely identifies application and the processing flow id that uniquely identifies the processing flow.

The metadata creation service device 12 retrieves, from the application/processing flow association information illustrated in FIG. 10, the processing flow id that is associated with the id of the application specified in the request for the scope. Then, the process proceeds to step S13, and the metadata creation service device 12 requests a scope from the input/output service device 10 while specifying the processing flow id associated with the id of the application specified in the request for the scope.

Upon receiving, from the metadata creation service device 12, the request for the scope that specifies the processing flow id, the input/output service device 10 proceeds to step S14 and refers to information of FIG. 11 that associates the processing flow and the scope (processing flow/scope association information), which is illustrated in FIGS. 11A and 11B.

FIGS. 11A and 11B are diagrams illustrating examples of the configuration of the processing flow/scope association information. The processing flow/scope association information of each of FIGS. 11A and 11B includes, as information items, the id, the processing flow name, and the scope. The processing flow/scope association information of FIG. 11 associates the processing flow with the scope by the id that uniquely identifies the processing flow and the scope.

For example, the example of FIG. 11A indicates that the scope required for the processing flow uniquely identified by the "io_20" is the scope "drive.file" of the external storage service "AAA."

The input/output service device 10 retrieves, for example, from the processing flow/scope association information illustrated in each of FIGS. 11A and 11B, the scope associated with the processing flow id specified in the request for the scope. Then, the scope retrieved by the input/output service device 10 is returned to the content providing service device 16 through the metadata creation service device 12.

The content providing service device 16 proceeds to step S15, and the content providing service device 16 requests authorized information of a user operating the terminal device 30 from the authentication service device 14. Upon receiving the request for the authorized information that specifies the user, the authentication service device 14 returns the authorized information associated with the user information.

The content providing service device 16 proceeds to step S16 and compares the scope of all the installed applications with the authorized information of the user, and the content providing service device 16 returns, to the terminal device 30, authorization information representing whether the scope required for the application has been authorized (coordinated).

Figure 12C:
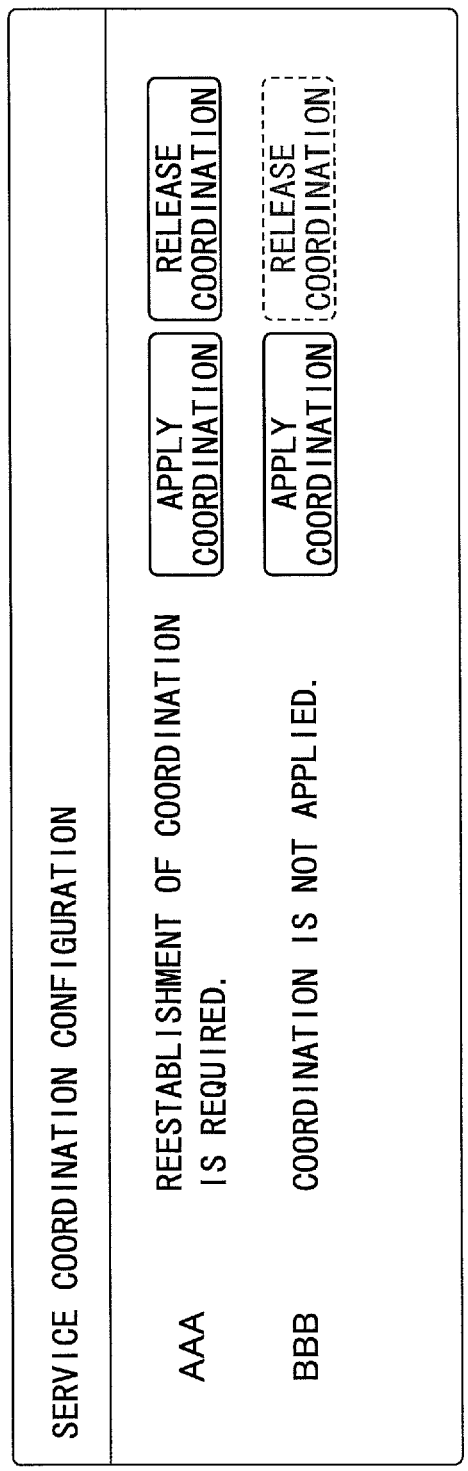
FIG. 12C is a diagram illustrating another example of the service coordination configuration screen.

The terminal device 30 that receives the authorization information displays, based on the authorization information, the service coordination configuration screen, such as that of illustrated in each of FIGS. 12A through 12C. FIGS. 12A through 12C are diagrams illustrating examples of the service coordination configuration screen.

The service coordination configuration screen illustrated in FIG. 12A is an example in which the scope required for the application has been authorized. Accordingly, buttons for releasing the coordination are provided in the service coordination configuration screen of FIG. 12A. The service coordination configuration screen illustrated in FIG. 12B is an example in which the scope required for the application has not been authorized. Accordingly, buttons for applying the coordination are provided in the service coordination configuration screen of FIG. 12B.

The service coordination configuration screen illustrated in FIG. 12C is an example of the screen in which a scope is added. The scope is required for the external storage service that has already been coordinated. In the service coordination configuration screen of FIG. 12C, a message "reestablishment of coordination is required" is displayed, instead of the message "coordination is not applied" of FIG. 12B. In the service coordination configuration screen of FIG. 12C, a button for applying coordination and a button for releasing coordination are provided.

Figure 13:
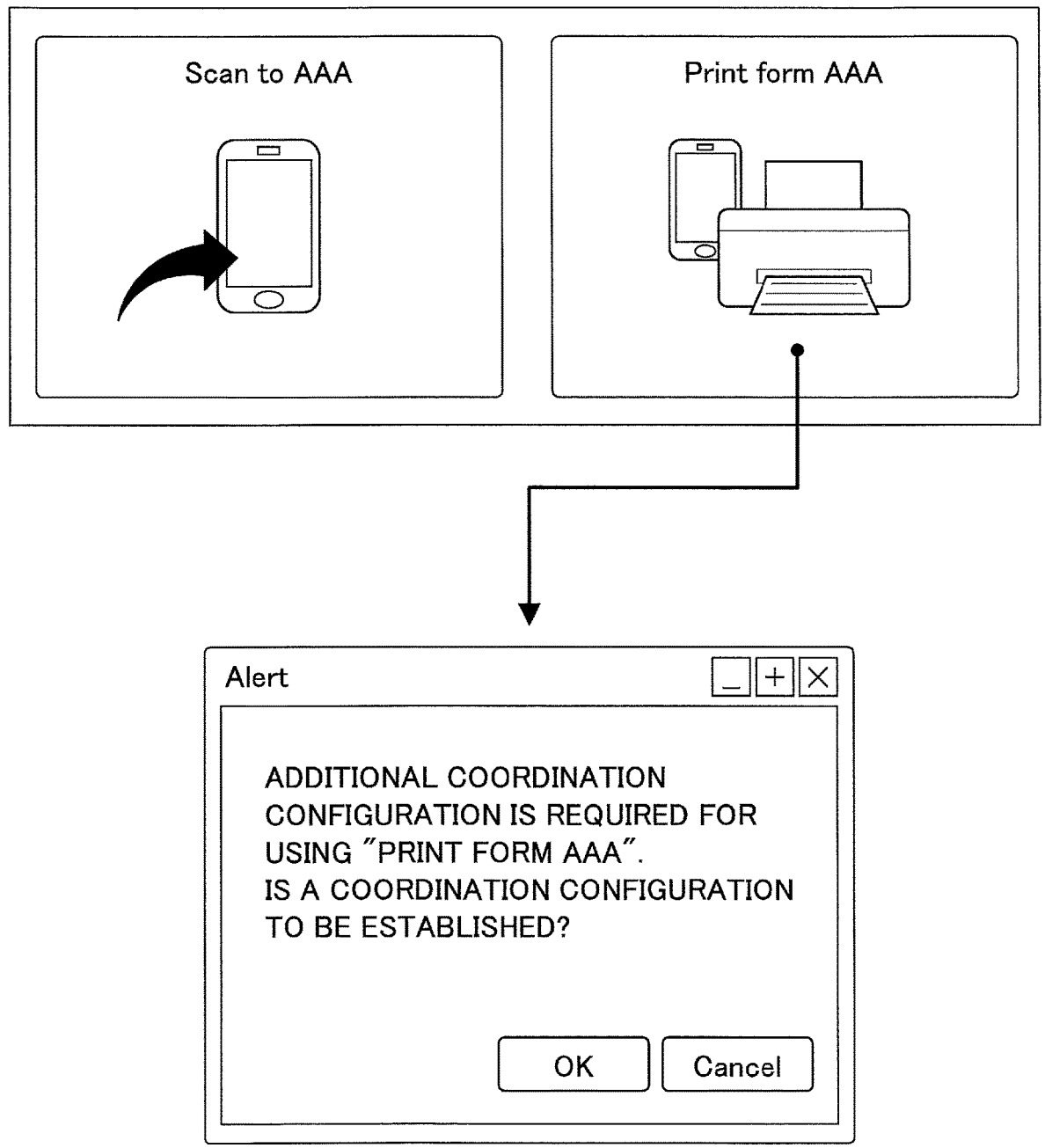
FIG. 13 is a diagram of an example of an authorization process confirmation screen transitioning from an application selection screen.

The example is described above in which the message indicating that reestablishment of coordination is required is displayed in the service coordination configuration screen. However, as illustrated in FIG. 13, a message indicating that reestablishment of coordination is required may be displayed when the application to be used is selected. FIG. 13 is a diagram illustrating an example of an authorization process confirmation screen that transitions from an application selection screen. For example, when an additional scope is required for using the application selected by a user in the application selection screen, the terminal device 30 may display a message indicating that additional coordination with an external storage service is required, as illustrated in the authorization process confirmation screen of FIG. 13.

<<S16: Comparison Process>>

The content providing service device 16 performs comparison between the scope of all the installed applications and the authorized information of the user as follows, for example. The content providing service device 16 merges the obtained scopes as illustrated in FIG. 14, for example. FIG. 14 is a diagram illustrating a configuration of an example of the merged scope. The example of FIG. 14 indicates that the scope required for the application is the scope "drive.file" and "drive.readonly" of the external storage service "AAA."

FIG. 15 is a diagram illustrating a configuration of an example of authorized information returned from the authentication service device 14. In the authorized information of FIG. 15, the authorized scope is described for each external storage service, in addition to basic information, such as the user ID.

For example, in FIG. 15, it is indicated that the scope "drive.file" and "drive.readonly" for the external storage service "AAA" have been authorized. By comparing the merged scope of FIG. 14 and the authorized scope included in the authorized information of FIG. 15, the content providing service device 16 determines whether the scope required for the application has been authorized.

For example, in the example of the merged scope of FIG. 14 and the authorized information of FIG. 15, a determination is made that the scope required for the application has been authorized because the scope required for the application of FIG. 14 matches the authorized scope of FIG. 15. Accordingly, the terminal device 30 displays the service coordination configuration screen, such as that of illustrated in FIG. 12A, which indicates that the scope required for the application has been authorized.

In the authorized information of FIG. 16, the authorized scope of FIG. 16 is insufficient for the scope required for the application of FIG. 14. Thus, a determination is made that the scope required for the application has not been authorized. Consequently, the terminal device 30 displays a service coordination configuration screen, such as that of illustrated in FIG. 12B, which indicates that the scope required for the application has not been authorized, or a service coordination configuration screen, such as that of illustrated in FIG. 12C. FIG. 16 is a diagram illustrating a configuration of another example of the authorized information returned from the authentication service device 14.

<<Authorization Process>>

Figure 17:
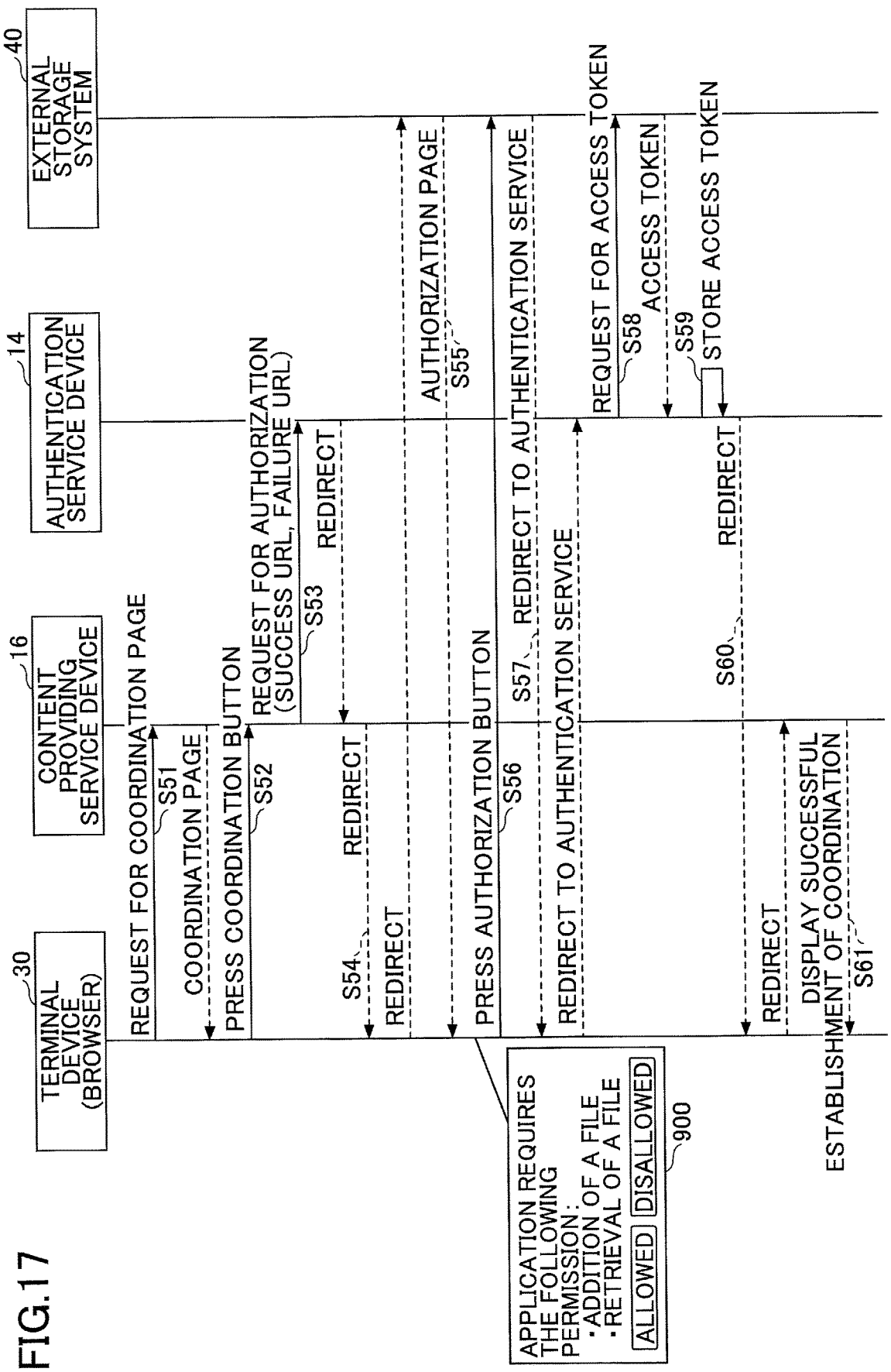
FIG. 17 is a sequence diagram of an example of an authorization process.

When the "apply coordination" button of the service coordination configuration screen is pressed, or the "OK" button of the authorization process confirmation screen is pressed, the authorization process of FIG. 17 is performed. FIG. 17 is a sequence diagram of an example of the authorization process.

At step S51, a user operates the terminal device 30 to access the service coordination configuration screen, such as that of illustrated in FIG. 12. The content providing service device 16 executes the process according to the sequence diagram illustrated in FIG. 9, and the content providing service device 16 causes the terminal device 30 to display, based on the authorization information, a service coordination configuration screen, such as that of illustrated in FIG. 12.

In response to detecting that the "apply coordination" button of the service coordination configuration screen is pressed, at step S52, the terminal device 30 reports, to the content providing service device 16, that the "apply coordination" button is pressed.

At step S53, the content providing service device 16 transmits a request for authorization to the authentication service device 14 while attaching, to the request for authorization, a success URL to be redirected upon determining that the authentication is successful and a failure URL to be redirected upon determining that the authentication is failed.

At step S54, the content providing service device 16 causes the terminal device 30 to redirect to an authorization page of the external storage system 44 so as to cause the terminal device 30 to display an authorization page screen 900 at step S55.

At step S56, a user operates the terminal device 30 and presses the "allowed" button of the authorization page screen 900. In response to detecting that the "allowed" button of the authorization page screen 900 is pressed, the terminal device 30 reports, to the external storage system 40, that the "allowed" button is pressed.

At step S57, the external storage system 40 causes the terminal device 30 to redirect to the authentication service device 14. At step S58, the authentication service device 14 obtains an access token from the external storage system 40. At step S59, the authentication service device 14 stores the access token.

At step S60, the authentication service device 14 causes the terminal device 30 to redirect to the content providing service device 16 so as to cause the terminal device to display, at step S61, that the authentication is successful. When the "apply coordination" button of the service coordination configuration screen of FIG. 12C is pressed, in order to add a new scope to the coordinated external storage service, the existing access token is discarded prior to transmitting the request for authorization at step S53, and the access token is obtained again.

Figure 18:
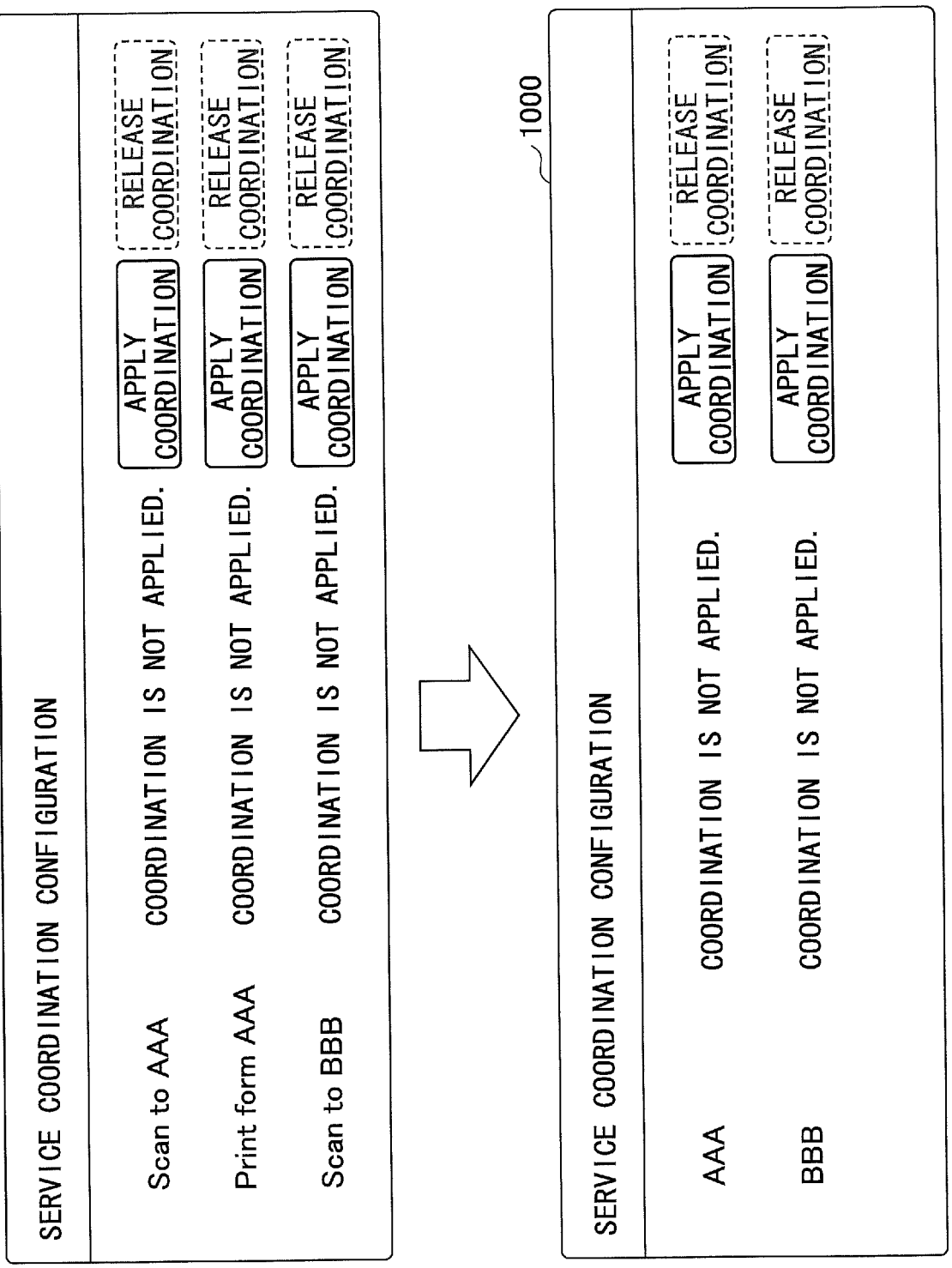
FIG. 18 is a diagram illustrating an example of the service coordination configuration screen for each application and an example of the service coordination configuration screen for each external service.

As described above, according to the embodiment, the entire scope of the external storage system 40 required for the installed applications can be collectively retrieved. Consequently, in the information processing system 1 according to the embodiment, an "allowed" button may be prepared for each external storage system 40, as in the service coordination configuration screen 1000 of FIG. 18, instead of preparing an "allowed" button for each application, as in the service coordination configuration screen 990 of FIG. 18.

Accordingly, when a user uses the device coordination service, the user is not required to perform an authorization process for each application, and the user is only required to perform an authorization process for each external service. Thus, a burden on a user for performing an authorization process for an external service, such as the external storage system 40, can be reduced.

For example, when a plurality of applications provided by the device coordination service is collectively sold or introduced as a package, even for the same external service, a user may be required to perform an authorization process for different scopes, which can be a burden on the user. In contrast, for the information processing system 1 according to the embodiment, a user is only required to perform an authorization process for each external service required by the installed applications. Thus, a burden on a user for performing an authorization process for the external service can be reduced.

Another Embodiment

In this embodiment, delegated authentication is used for coordination with an external storage system 40 that does not support the OAuth authentication. In the delegated authentication, identification (ID) and a password of a user of the external storage system 40 are configured, in advance, in the service providing environment E1, and the service providing environment E1 uses the external storage system 40 using the ID and the password of the user.

Note that this embodiment is the same as the above-described embodiment except for one part. Accordingly, the description of the parts that are the same as the corresponding parts of the above-described embodiment is omitted as appropriate. The system configuration and the hardware configuration of this embodiment are the same as the system configuration and the hardware configuration of the above-described embodiment.

<Software Configuration>

The input/output service device 10, the metadata creation service device 12, the authentication service device 14, the content providing service device 16, and the terminal device 30 of the information processing system 1 according this embodiment can be implemented, for example, by processing blocks, which are described below. Note that, in the following description, the processing blocks that are not required for the description of the embodiment are omitted.

<<Input/Output Service Device>>

Figure 19:
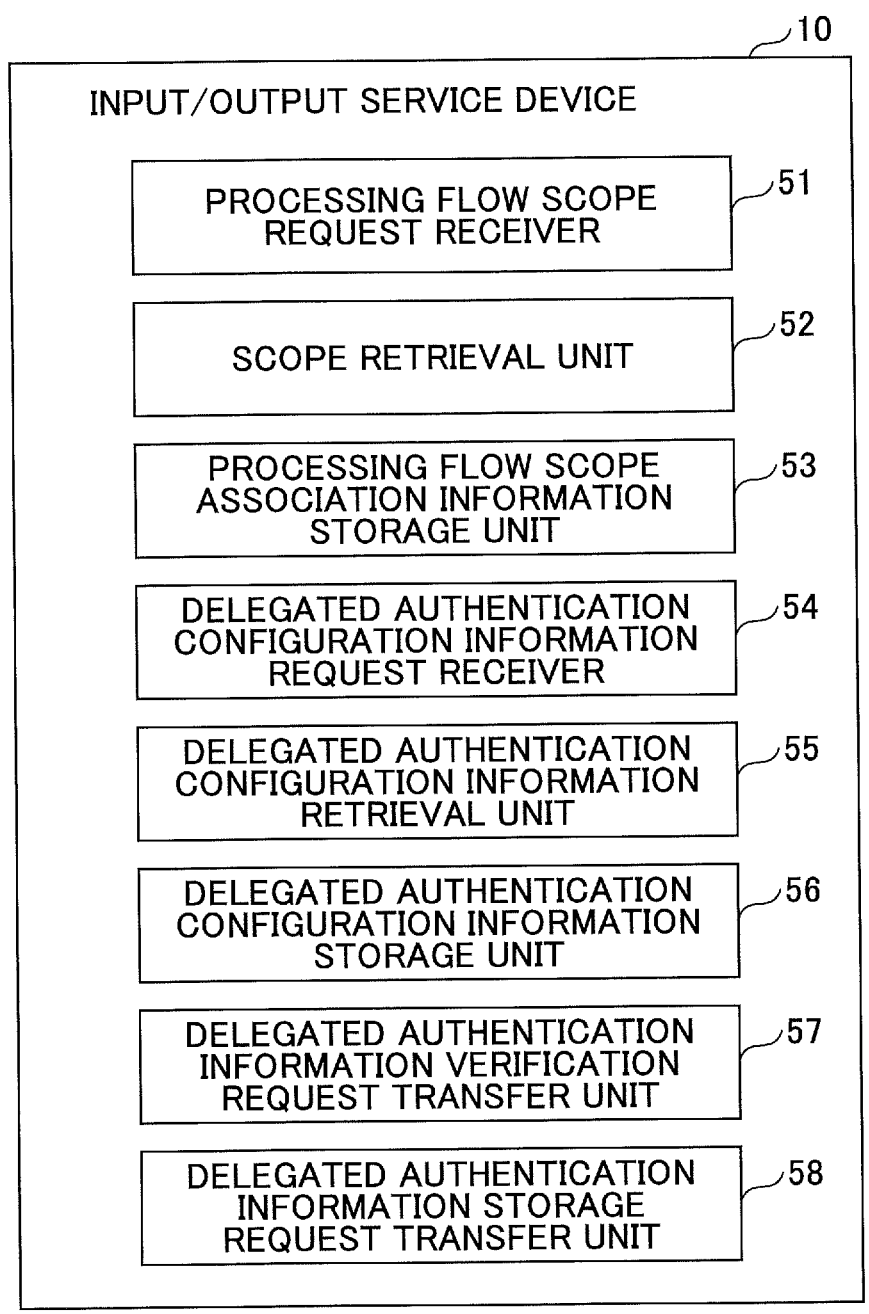
FIG. 19 is a diagram illustrating processing blocks of an example of the input/output service device according to another embodiment.

FIG. 19 is a diagram illustrating processing blocks of an example of the input/output service device 10 according to the embodiment. The input/output service device 10 of FIG. 19 is configured such that, a delegated authentication configuration information request receiver 54, a delegated authentication configuration information retrieval unit 55, a delegated authentication configuration information storage unit 56, a delegated authentication information verification request transfer unit 57, and a delegated authentication information storage request transfer unit 58 are added to the input/output service device 10 of FIG. 4.

The delegated authentication configuration information request receiver 54 receives, from the metadata creation service device 12, a delegated authentication configuration information request in which an application is specified, and the delegated authentication configuration information request receiver 54 returns the delegated authentication configuration information for the external storage system 40 associated with the application. The delegated authentication configuration information retrieval unit 55 retrieves, from the delegated authentication configuration information storage unit 56, the delegated authentication configuration information for the external storage system 40 associated with the application. The delegated authentication configuration information storage unit 56 stores the application and the associated delegated authentication configuration information for the external storage system 40. The delegated authentication information verification request transfer unit 57 transfers, to the external storage system 40, a verification request for the delegated authentication information received from the terminal device 30. The delegated authentication information verification request transfer unit 57 returns the result of the verification to the terminal device 30. The delegated authentication information storage request transfer unit 58 transfers, to the authentication service device 14, a request for storing the delegated authentication information received from the terminal device 30. The delegated authentication information storage request transfer unit 58 returns the storage result to the terminal device 30.

<<Metadata Creation Service Device>>

Figure 20:
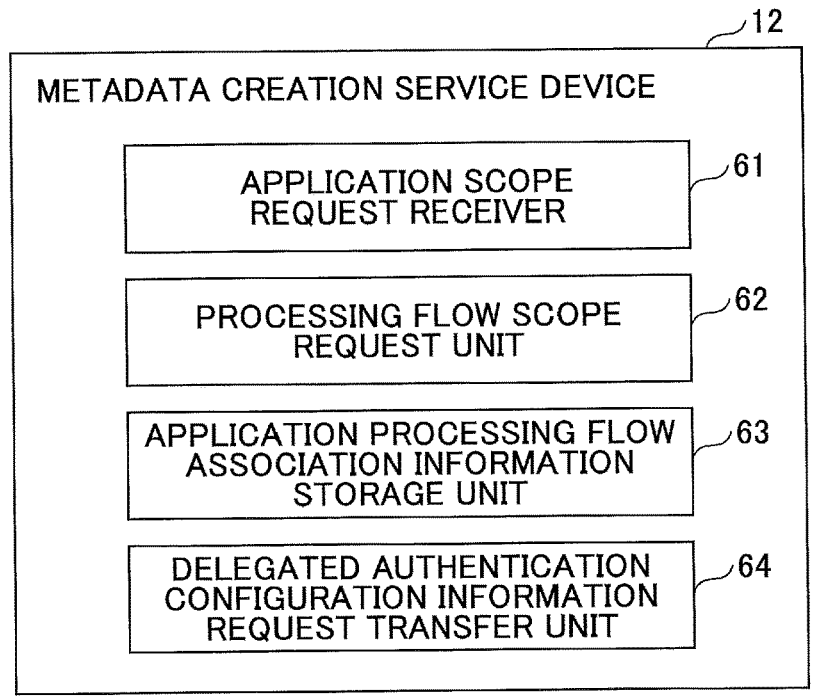
FIG. 20 is a diagram illustrating processing blocks of an example of the metadata creation service device according to the embodiment.

FIG. 20 is a diagram illustrating processing blocks of an example of the metadata creation service device 12 according to the embodiment. The metadata creation service device 12 of FIG. 20 is configured such that a delegated authentication configuration information request transfer unit 64 is added to the metadata creation service device 12 of FIG. 5. The delegated authentication configuration information request transfer unit 64 receives, from the content providing service device 16, a delegated authentication configuration information request in which an application is specified. The delegated authentication configuration information request transfer unit 64 transfers the delegated authentication configuration information request to the input/output service device 10.

The delegated authentication configuration information request transfer unit 64 retrieves, from the input/output service device 10, the delegated authentication configuration information for the external storage system 40 associated with the application. The delegated authentication configuration information request transfer unit 64 returns the delegated authentication configuration information to the content providing service device 16.

<<Authentication Service Device>>

Figure 21:
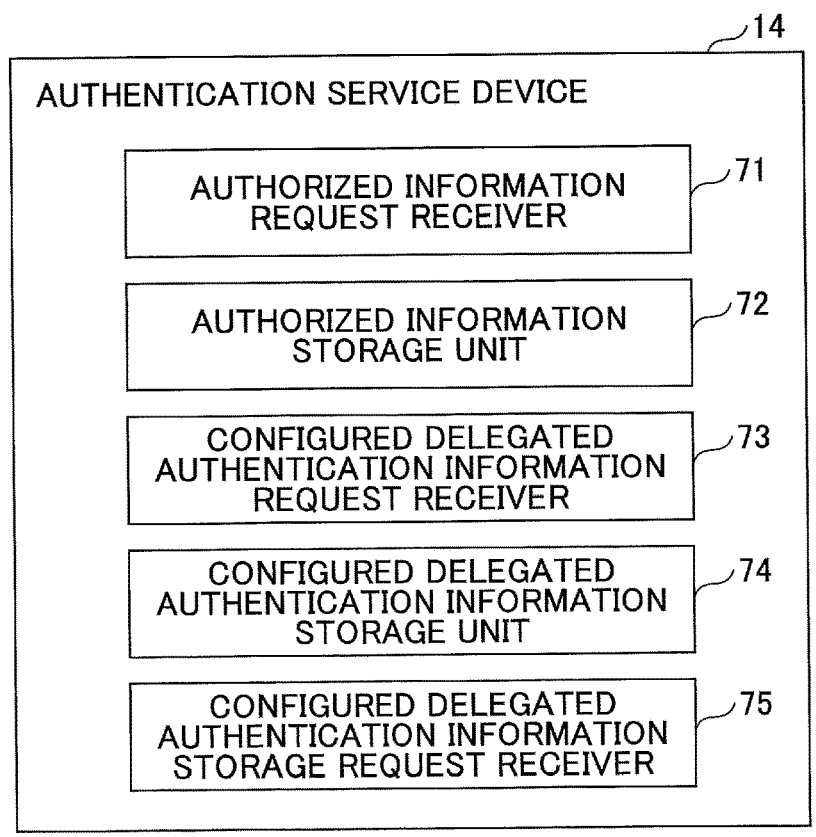
FIG. 21 is a diagram illustrating processing blocks of an example of the authentication service device according to the embodiment.

FIG. 21 is a diagram illustrating processing blocks of an example of the authentication service device 14 according to the embodiment. The authentication service device 14 of FIG. 21 is configured such that a configured delegated authentication information request receiver 73, a configured delegated authentication information storage unit 74, and a configured delegated authentication information storage request receiver 75 are added to the authentication service device 14 of FIG. 6.

The configured delegated authentication information request receiver 73 receives, from the content providing service device 16, a configured delegated authentication information request in which a user is specified. The configured delegated authentication information request receiver 73 returns the configured delegated authentication information of the user for the external storage system 40. The configured delegated authentication information storage unit 74 stores the user information and the associated configured delegated authentication information for the external storage system 40. The configured delegated authentication information storage request receiver 75 receives, from the input/output service device 10, a request for storing the delegated authentication information of the user for the external storage system 40. The configured delegated authentication information storage request receiver 75 returns, to the input/output service device 10, a result of storing the delegated authentication information in the configured delegated authentication information storage unit 74.

<<Content Providing Service Device>>

Figure 22:
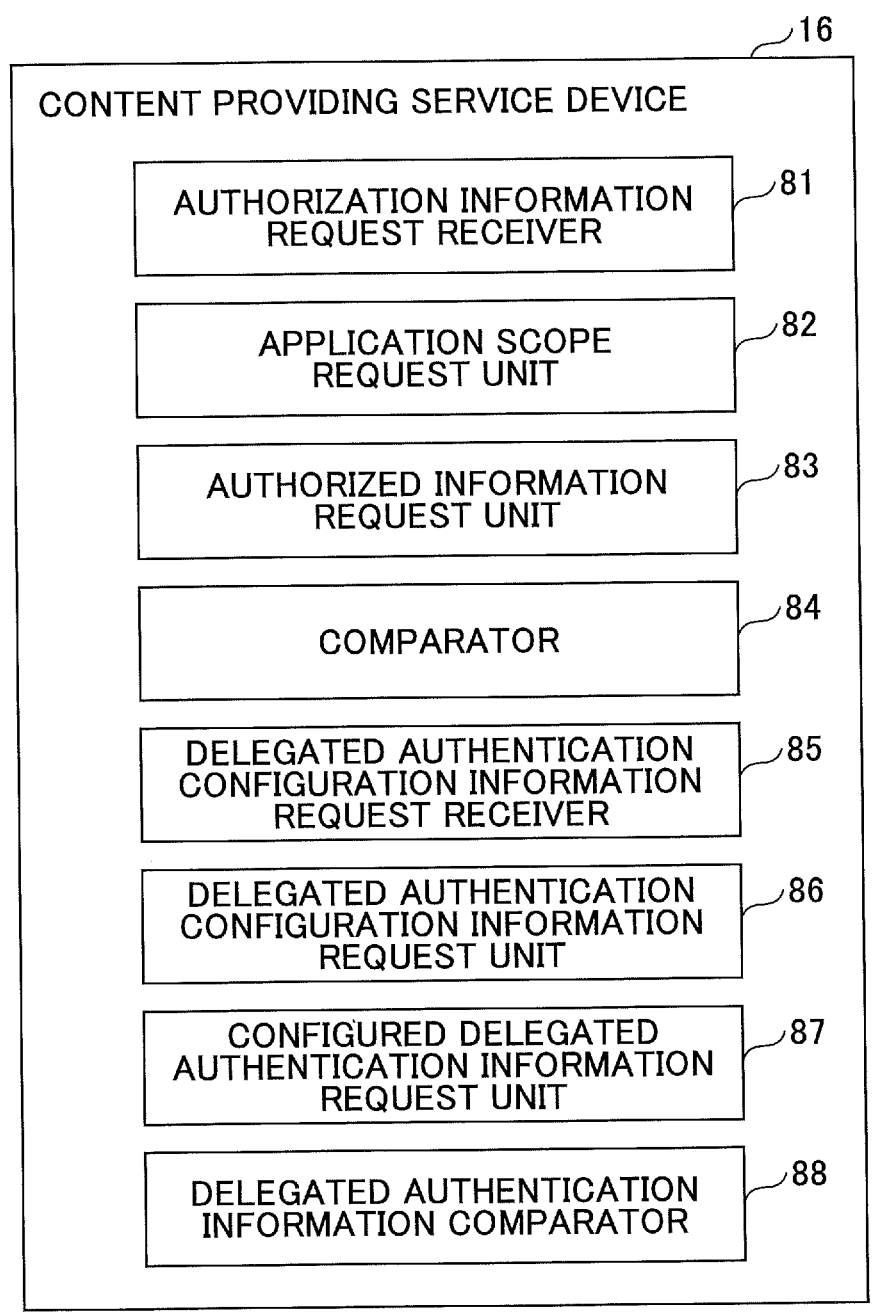
FIG. 22 is a diagram illustrating processing blocks of an example of the content providing service device according to the embodiment.

FIG. 22 is a diagram illustrating processing blocks of an example of the content providing service device according to the embodiment. The content providing service device 16 of FIG. 22 is configured such that a delegated authentication configuration information request receiver 85, a delegated authentication configuration information request unit 86, a configured delegated authentication information request unit 87, and a delegated authentication information comparator 88 are added to the content providing service device 16 of FIG. 7.

The delegated authentication configuration information request receiver 85 receives, from the terminal device 30 operated by a user, a delegated authentication configuration information request. The delegated authentication configuration information request receiver 85 returns the delegated authentication configuration information of the user operating the terminal device 30. The delegated authentication configuration information request unit 86 requests, from the metadata creation service device 12, delegated authentication configuration information for the external storage system 40 used by, among all the installed applications, an application for which delegated authentication is required, and the delegated authentication configuration information request unit 86 obtains the delegated authentication configuration information.

The configured delegated authentication information request unit 87 requests, from the authentication service device 14, configured delegated authentication information of the user operating the terminal device 30 for the external storage system 40, and the configured delegated authentication information request unit 87 obtains the configured delegated authentication information of the user. The delegated authentication information comparator 88 obtains, as the delegated authentication configuration information, a result of comparing the delegated authentication configuration information for the external storage system 40 which requires the delegated authentication with the configured delegated authentication information of the user for the external storage system 40.

<<Terminal Device>>

Figure 23:
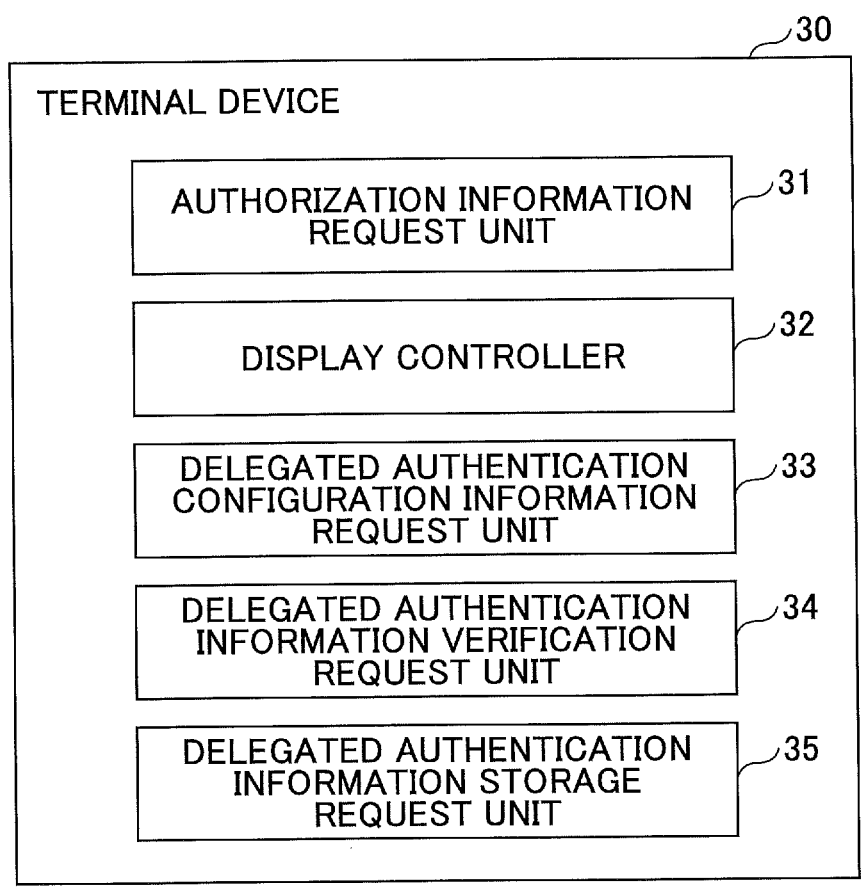
FIG. 23 is a diagram illustrating processing blocks of an example of the terminal device according to the embodiment.

FIG. 23 is a diagram illustrating processing blocks of an example of the terminal device 30 according to the embodiment. A browser is installed in the terminal device 30. The terminal device 30 of FIG. 23 implements, by executing a client application on the browser, an authorization information request unit 31, a display controller 32, a delegated authentication configuration information request unit 33, a delegated authentication information verification request unit 34, and a delegated authentication information storage request unit 35. The terminal device 30 of FIG. 23 is configured such that the delegated authentication configuration information request unit 33, the delegated authentication information verification request unit 34, and the delegated authentication information storage request unit 35 are added to the terminal device 30 of FIG. 8.

The delegated authentication configuration information request unit 33 requests, from the content providing service device 16, the delegated authentication configuration information for the external storage system 40 used by, among all the installed applications, an application for which the delegated authentication is required, and the delegated authentication configuration information request unit 33 obtains the delegated authentication configuration information. The delegated authentication information verification request unit 34 requests the input/output service device 10 to verify the delegated authentication information of the user for the external storage system 40, and the delegated authentication information verification request unit 34 obtains the verification result. The delegated authentication information storage request unit 35 requests the input/output service device 10 to store the delegated authentication information of the user for the external storage system 40, and the delegated authentication information storage request unit 35 obtains the storage result.

<Details of the Process>

Next, details of the process by the information processing system 1 according to the embodiment are described.

<<Collective Retrieval of Delegated Authentication Information>>

Figure 24:
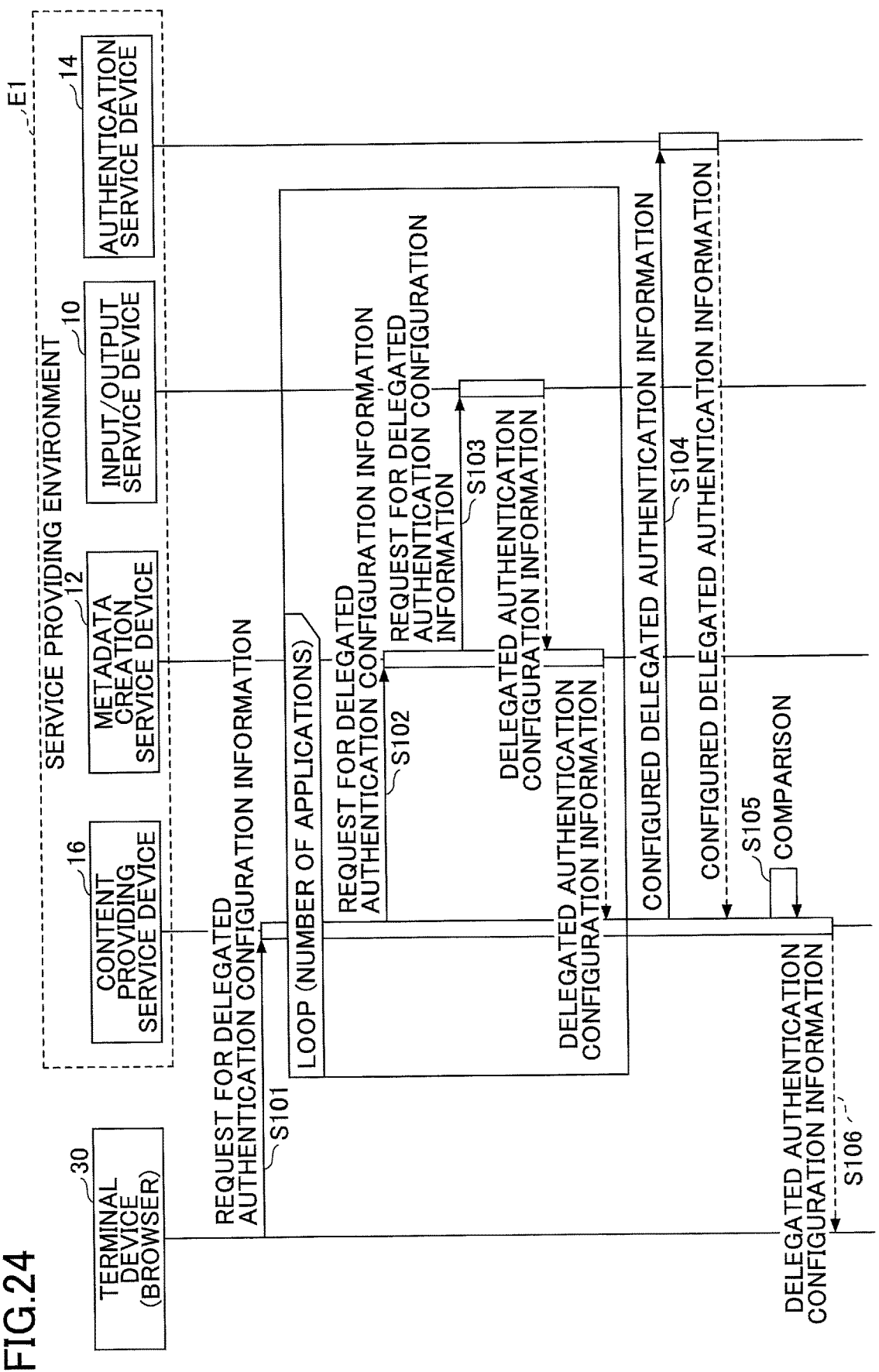
FIG. 24 is a sequence diagram of an example of a process of collectively retrieving delegated authentication information.

FIG. 24 is a sequence diagram of an example of collectively retrieving delegated authentication information. At step S101, the terminal device 30 requests, from the content providing service device 16, delegated authentication configuration information for the external storage system used by, among all the installed applications, an application for which delegated authentication is required. This request is transmitted, for example, when the browser of the terminal device 30 accesses the service coordination configuration screen, which is described below.

After receiving the request for the delegated authentication configuration information at step S101, the content providing service device 16 retrieves the delegated authentication configuration information for the external storage system 40 that is used by, among all the installed applications, the application for which the delegated authentication is required. In the sequence diagram of FIG. 24, by repeating the process from step S102 through step S103 by the number of the installed applications, the delegated authentication configuration information for the external storage system 40 for which the delegated authentication is required is obtained. At step S102, the content providing service device 16 requests the delegated authentication configuration information for the external storage system 40 from the metadata creation service device 12 while specifying an application. After receiving the request for the delegated authentication configuration information for the external storage system 40, in which the application is specified, the metadata creation service device 12 proceeds to step S103 and transfers, to the input/output service device 10, the request for the delegated authentication configuration information for the external storage system 40, in which the application is specified.

After receiving, from the metadata creation service device 12, the request for the delegated authentication configuration information for the external storage system 40, in which the application is specified, the input/output service device 10 retrieves, from the delegated authentication configuration information storage unit 56, the delegated authentication configuration information for the external storage system 40, which corresponds to the specified application. Then, the delegated authentication configuration information for the external storage system 40 retrieved by the input/output service device 10 is returned to the content providing service device 16 through the metadata creation service device 12.

The content providing service device 16 proceeds to step S104 and requests configured delegated authentication information of a user operating the terminal device 30 for the external storage system 40 from the authentication service device 14. After receiving the request for the configured delegated authentication information for the external storage system 40, in which the user is specified, the authentication service device 14 returns the configured delegated authentication information for the external storage system 40, which corresponds to the user.

The process proceeds to step S105, and the content providing service device 16 compares the delegated authentication configuration information for the external storage system 40 for which the delegated authentication is required with the configured delegated authentication information of the user for the external storage system 40. The content providing service device 16 returns, to the terminal device 30, information indicating whether the delegated authentication information for the external storage system 40 required for using the application has already configured (coordinated) and, if the delegated authentication information has already configured, the delegated authentication configuration information representing an account name, based on the result of the comparison.

The delegated authentication configuration information returned to the terminal device 30 is represented in a JavaScript Object Notation (JSON) format, such as that of illustrated in FIG. 25. FIG. 25 is a configuration diagram of an example of the delegated authentication configuration information. In the delegated authentication configuration information of FIG. 25, a name of a service of the external storage system 40, a parameter name, and a display name of the parameter are stored.

Figure 26A:
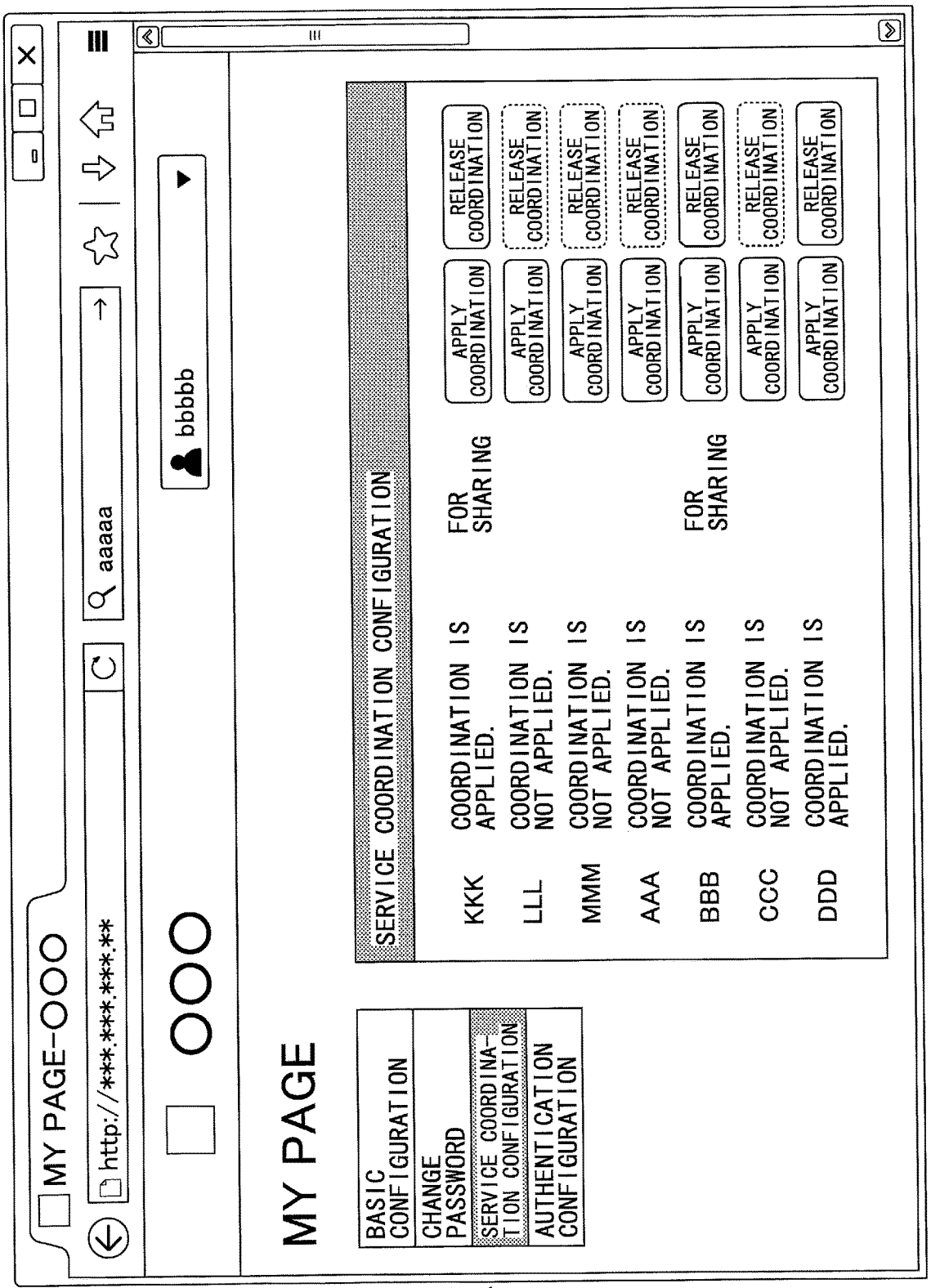
FIG. 26A is a diagram illustrating an example of the service coordination configuration screen.

After receiving the delegated authentication configuration information, the terminal device 30 displays, based on the delegated authentication configuration information, the service coordination configuration screen, such as that of illustrated in FIG. 26. FIGS. 26A and 26B are diagrams illustrating examples of the service coordination configuration screen.

The service coordination configuration screen of FIG. 26A is an example of collectively displaying both the external storage system 40 supporting the OAuth authentication and the external storage system 40 not supporting the OAuth authentication. The service coordination configuration screen of FIG. 26A includes buttons for apply coordination with and buttons for release coordination with the external storage system 40 supporting the OAuth authentication and the external storage system 40 not supporting the OAuth authentication.

For example, upon detecting that the button for applying coordination with the external storage system 40 supporting the OAuth authentication is pressed in the service coordination configuration screen of FIG. 26A, an authorization process of the OAuth authentication is executed in accordance with the above-described embodiment. Further, upon detecting that the button for applying coordination with the external storage system 40 not supporting the OAuth authentication is pressed in the service coordination configuration screen of FIG. 26A, the information processing system 1 according to this embodiment displays a delegated authentication configuration screen of FIG. 26B. The delegated authentication configuration screen of FIG. 26B is an example of a screen for applying coordination using the delegated authentication.

For example, when a user inputs "User ID" and "Password" into the delegated authentication configuration screen of FIG. 26B and presses the "apply coordination" button, the information processing system 1 according to this embodiment executes a process, such as that of indicated in FIG. 27. The "User ID" and the "Password" that are input into the delegated authentication configuration screen are an example of the delegated authentication information.

At step S151, the terminal device 30 requests the input/output service device 10 to verify the delegated authentication information configured in the delegated authentication configuration screen of FIG. 26B. The input/output service device 10 proceeds to step S152 and requests the external storage system 40 to verify the delegated authentication information, and the input/output service device 10 receives the verification result. If the delegated authentication information is correct, the process proceeds to step S153, and the terminal device 30 requests the input/output service device 10 to store the delegated authentication information for the external storage system 40, which is configured in the delegated authentication configuration screen of FIG. 26B. The input/output service device 10 proceeds to step S154 and requests the authentication service device 14 to store the delegated authentication information for the external storage system 40, and the input/output service device 10 obtains the storage result.

As described above, according to this embodiment, even if the external storage system 40 does not support the OAuth authentication, the "allowed" button can be prepared for each external storage system 40, as in the service coordination configuration screen of FIG. 26A.

Consequently, it is not necessary for a user using the device coordination service to perform delegated authentication for each application, and the user is only required to perform a delegated authentication process for each external service. Thus, a burden on the user for performing the delegated authentication process for the external service, such as the external storage system 40, can be reduced. It is possible to apply coordination with the external storage system 40 in the same service coordination screen regardless of whether the external storage system 40 supports the OAuth authentication. Thus, it is easy for a user to apply coordination.

Another Embodiment

In this embodiment, when an application to be used in the image forming apparatus 20 is selected and it is detected that a service coordination configuration is required, a message for prompting to configure the service coordination is to be displayed. Note that this configuration is the same as the above-described embodiment, except for one part. Accordingly, the description of the parts that are the same as the corresponding parts of the above-described embodiment is omitted as appropriate. The system configuration, the hardware configuration, and the software configuration of this embodiment are the same as the system configuration, the hardware configuration, and the software configuration of the above-described embodiment.

<Details of the Process>

Next, details of the process by the information processing system 1 according to the embodiment are described.

<<Collective Retrieval of Delegated Authentication Information>>

FIG. 28 is a sequence diagram of an example of collectively retrieving delegated authentication information. At step S211, the terminal device 30 requests authorization information from the content providing service device 16. This request is transmitted, for example, when the browser of the terminal device 30 accesses the service coordination configuration screen, which is described below.

After receiving the request for the authorization information, the content providing service device 16 repeats the process from step S212 through step S214 by the number of the installed applications. At step S212, the content providing service device 16 requests a scope from the metadata creation service device 12, while specifying an application.

After receiving the request for the scope, in which the application is specified, the metadata creation service device 12 refers to information that associates the application and the processing flow (application/processing flow association information), such as that of illustrated in FIG. 10. The metadata creation service device 12 retrieves, from the application/processing flow association information of FIG. 10, the processing flow id associated with the id of the application that is specified in the request for the scope. Then, the metadata creation service device 12 proceeds to step S213 and requests the scope from the input/output service device 10, while specifying the processing flow id associated with the id of the application that is specified in the request for the scope.

After receiving, from the metadata creation service device 12, the request for the scope, in which the processing flow id is specified, the input/output service device 10 proceeds to step S214 and refers to the information that associates the processing flow and the scope (processing flow/scope association information), such as that of illustrated in FIG. 11.

The input/output service device 10 retrieves the scope associated with the processing flow id that is specified in the request for the scope, for example, from the processing flow/scope association information illustrated in FIG. 11. Then, the scope retrieved by the input/output service device 10 is returned to the content providing service device 16 through the metadata creation service device 12.

Further, the content providing service device 16 proceeds to step S215 and requests authorized information of a user operating the terminal device from the authentication service device 14. After receiving the request for the authorized information, in which the user is specified, the authentication service device 14 returns the authorized information that is associated with the user.

At step S216, the content providing service device 16 compares the scope of all the installed applications with the authorized information of the user, and the content providing service device 16 creates authorization information indicating whether the scope required to the application has been authorized (coordinated). At step S217, the content providing service device 16 returns the created authorization information to the terminal device 30.

<<S216: Authorization Information Creation Process>>

The content providing service device 16 creates the authorization information based on the scope of all the installed applications and the authorized information of the user as follows, for example. The content providing service device 16 merges the obtained scope, such as that of illustrated in FIG. 29.

FIG. 29 is a configuration diagram of an example of the merged scope. In the example of FIG. 29, it is indicated that the scope "drive.file" of the external storage service "AAA" and the scope "AllSites.Write" of the external storage service "BBB" are required for the application.

FIG. 30 is a configuration diagram of an example of the authorized information returned from the authentication service device 14. In the authorized information of FIG. 30, in addition to the basic information, such as the user ID, the authorized scope is described for each external storage service.

For example, in FIG. 30, it is indicated that the scope "drive," "drive.appfolder," and "drive.file" for the external storage service "AAA" has been authorized. Further, in FIG. 30, it is indicated that the scope "AllSites.Write" for the external storage service "BBB" has been authorized.

In FIG. 30, "tenant_id" and "user_id" are values to be assigned to a tenant and a user, respectively. In FIG. 30, "name" and "mail" are a name and a mail address of a user specified during user registration. In FIG. 30, "oauth" is authorization information for each external storage service.

In FIG. 30, "oauth_id" is an automatically assigned value, which is unique within the tenant. In FIG. 30, "service" is an identifier of an external storage service. In FIG. 30, "scope" is authorization for using a service, which is defined for each service. In FIG. 30, "delegator" is a parameter for specifying use of authorization information. When an identifier of a service is included in "delegator" of FIG. 30, the authorization information becomes unavailable except for the service.

The content providing service device 16 creates, based on the merged scope of FIG. 29 and the authorized scope included in the authorized information of FIG. 30, the authorization information, such as that of illustrated in FIG. 31, and the content providing service device 16 returns the created authorization information to the terminal device 30. FIG. 31 is a configuration diagram of an example of the authorization information returned from the content providing service device 16.

The authorization information of FIG. 31 includes a scope required for each external storage service, a scope associated with user information, and information indicating whether reauthorization is required. In FIG. 31, "requiredScope" indicates the required scope. In FIG. 31, "authorized" indicates whether it is authorized (coordinated). In FIG. 31, "scopes" represents scopes associated with (coordinated with) user information. In FIG. 31, "requiredAuthorize" represents whether reauthorization is required (whether update of the coordination is required).

<<Authorization Information Confirmation Process>>

Figure 32:
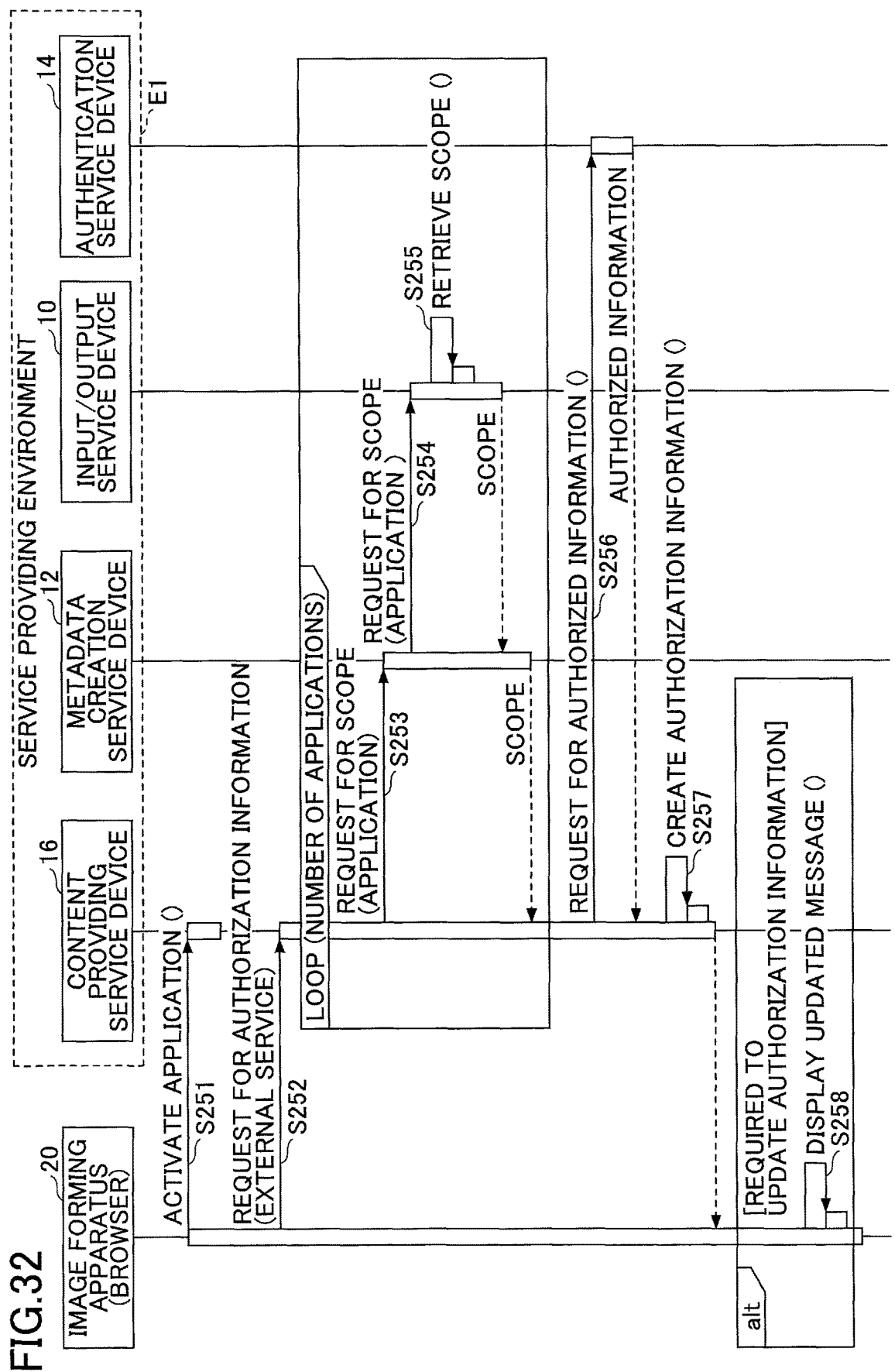
FIG. 32 is a sequence diagram of an example of an authorization information confirmation process.

When the authorization information is to be confirmed by an application running on the browser of the image forming apparatus 20, the authorization information confirmation process illustrated in FIG. 32 is executed. FIG. 32 is a sequence diagram of an example of the authorization information confirmation process. At step S251, the browser of the image forming apparatus 20 reports activation of the application to the content providing service device 16.

At step S252, the application activated on the browser of the image forming apparatus 20 requests authorization information from the content providing service device 16 while attaching the identifier of the external storage service to be used. After receiving the request for the authorization information, the content providing service device 16 retrieves the scope and the authorized information by the procedure similar to the procedure from step S212 through step S215 of FIG. 28.

At step S257, the content providing service device 16 extracts a part of the identifier related to the external storage service from the identifier attached at step S252 so as to create the authorization information, and the content providing service device 16 returns the created authorization information to the application on the browser of the image forming apparatus 20. After receiving the authorization information, at step S258, the application confirms whether update of the authorization information is required. If it is determined that update of the authorization information is required, the application displays an authorization information update notification screen, which is described below.

FIG. 33 is a configuration diagram of an example of the authorization information returned to the application on the browser of the image forming apparatus 20, at a time of specifying the external storage service. The application on the browser of the image forming apparatus 20 can determine whether update of the authorization information is required, for example, based on a value of "requiredAuthorize" of the authorization information of FIG. 33. The authorization information of FIG. 33 is an example in which it is required to update the authorization information due to an increase in the required scope. Note that the authorization information may be updated when the required scope is reduced.

FIGS. 34A through 34C are diagrams illustrating an example of information held by the application and examples of an authorization information update notification screen. FIG. 34A illustrates the example of the information held by the application. FIG. 34B and FIG. 34C illustrate the examples of the authorization information update notification screen, which is displayed when it is determined that update of the authorization information is required.

FIG. 34A includes "appInstanceName" and "appInstanceId" indicating a name and an ID to be assigned when the application is created, and "authMode" indicating the type of the application. When "authMode" indicating the type of the application is "tenant," the application operates in a sharing mode. When "authMode" indicating the type of the application is "user," the application operates in a personal mode.

When it is determined that update of the authorization information is required, the application determines whether the authentication information update notification screen illustrated in FIG. 34B or FIG. 34C is to be displayed, depending on the type of the application determined by the value of "authMode." When the type of the application is "sharing," in which an administrator is supposed to configure the application, the application displays the authentication information update notification screen, such as that of illustrated in FIG. 34B, so as to prompt the administrator to update the scope. When the type of the application is "personal," in which an individual is supposed to configure the application, the application displays the authentication information update notification screen, such as that of illustrated in FIG. 34C, so as to prompt the individual to update the scope.

<<Authorization Information Update Process>>

FIG. 35 is a sequence diagram of an example of an authorization information update process. The authorization information update process of FIG. 35 is executed following the process of FIG. 32. Accordingly, the content providing service device 16 has already obtained the scope of FIG. 29 and the authorized information of FIG. 30.

At step S301, the terminal device 30 transmits, to the content providing service device 16, a request for updating the authorization information while attaching the authorization information to be updated and the required scope to the request. At step S302, the content providing service device 16 requests the authentication service device 14 to update the scope of the specified external storage service.

After updating the scope of the specified external storage service, at step S303, the content providing service device 16 transmits, to the authentication service device 14, a request for an authorization screen URL (a request for updating the authorization information) for performing authorization with the updated scope. At step S304, the content providing service device 16 receives the authorization screen URL, and the content providing service device 16 causes the browser of the terminal device 30 to display the authorization screen. At step S306, an administrator or an individual user operating the terminal device 30 performs authorization of the external storage service on the authentication screen displayed on the browser at step S305.

According to this embodiment, when the scope of the external storage system 40 required by the installed application is insufficient, the image forming apparatus 20 can be caused to display the authentication information update notification screen so as to prompt update of the authorization information.

Further Embodiment

In the above-described embodiments, the examples are described in which the user using the device coordination service configures the service coordination from the terminal device 30. However, the embodiments are not limited to this. For example, the user using the device coordination service may configure the service coordination from the image forming apparatus 20. For example, after receiving a request for using the application provided by the device coordination service from a user, the image forming apparatus 20 may execute the process of collectively retrieving the authorization information, such as that of illustrated in FIG. 9, or the process of collectively retrieving the delegated authorization information, such as that of illustrated in FIG. 24, and the image forming apparatus 20 may prompt the user to perform an authorization process or a delegated authentication process, depending on necessity.

The present invention is not limited to the specifically disclosed embodiments, and variations and modifications may be made without departing from the scope of the present invention. The image forming apparatus 20 is an example of an electronic device in a user environment. The application processing flow association information storage unit 63 is an example of a first associating unit. The processing flow scope association information storage unit 53 is an example of a second associating unit. The scope is an example of the scope of use of the external service. The scope retrieval unit 52 is an example of a usage scope retrieval unit. The authorized information request unit 83 is an example of an authorized information retrieval unit. The authorization information request receiver 81 is an example of a providing unit. The input/output service device 10, the metadata creation service device 12, the authentication service device 14 and the content providing service device 16 of the service providing environment E1 are examples of the information processing device and the information processing system described in the claims.

The present application is based on and claims the benefit of priority of Japanese Priority Application No. 2016-214458 filed on Nov. 1, 2016, Japanese Priority Application No. 2017-031128 filed on Feb. 22, 2017, and Japanese Priority Application No. 2017-122947 filed on Jun. 23, 2017, the entire contents of which are hereby incorporated herein by reference.

What is claimed is:

1. An information processing device in which an application of a service coordinated with an electronic device of a user environment provides the service to a user operating the electronic device, the information processing device including
a processor; and
a memory that includes instructions, which when executed, cause the processor to execute the following steps:
for each application of one or more applications installed in the information processing device,
associating the application with a processing flow invoked by the application and storing the application and the associated processing flow in the memory;
associating the processing flow with a first scope of authorization representing one or more first external services that are required to be authorized by the user so that the processor is allowed to execute the processing flow, and storing the processing flow and the associated first scope in the memory;
retrieving, from the memory, the first scope of the authorization;
retrieving a second scope of authorization representing one or more second external services that have been authorized by the user; and
providing, for each first external service of the one or more first external services represented by the first scope of the authorization, information indicating whether the first external service is required to be authorized by the user, based on a result of comparing the first scope of the authorization with the second scope of the authorization.

2. The information processing device according to claim 1, wherein, upon determining that the first scope of the authorization includes a scope other than the second scope of the authorization, the step of providing provides information indicating that additional authorization is required for each first external service of the one or more first external services.

3. The information processing device according to claim 1, wherein the electronic device operated by the user and the one or more first external services are caused to be coupled by a redirection process so as to cause the electronic device and the one or more first external services to execute a process of authorizing the first scope of the authorization of the one or more first external services required by the processing flow that is associated with the application capable of being used by the user.

4. The information processing device according to claim 1, wherein, upon detecting that the user selects the application of the one or more applications to be used, the step of providing provides, for each first external service of the one or more first external services, information indicating whether the first external service is authorized, based on a result of comparing the first scope of the authorization with the second scope of the authorization.

5. The information processing device according to claim 1, wherein the steps to be executed by the processor further includes
associating identifiers of one or more third external services used by the application with first delegated authentication configuration information representing the one or more third external services for which delegated authentication is required and storing the identifiers of the one or more third external services used by the application and the associated first delegated authentication configuration information in the memory;
retrieving, from the memory, the first delegated authentication configuration information;
retrieving second delegated authentication information representing one or more specific external services, wherein the delegated authentication information has been configured by the user; and
providing, for each third external service, information indicating whether delegated authentication information has been configured based on a result of comparing the first delegated authentication configuration information with the second delegated authentication information.

6. The information processing device according to claim 5, wherein the steps to be executed by the processor further includes
receiving, for each of the one or more third external services, delegated authentication configuration information.

7. The information processing device according to claim 1, wherein the steps executed by the processor further include:
providing information indicating that additional authentication is required while providing a button for starting execution of the additional authorization.

8. The information processing device according to claim 1, wherein the steps executed by the processor further include:
merging a plurality of first scopes of authorization of a respective plurality of external services.

9. The information processing device according to claim 1, wherein the electronic device is an image forming apparatus including a printer or a scanner, wherein the image forming apparatus is provided with an image forming function,
wherein the image forming apparatus is configured to:
receive a selection of a print application for using the printer or a scanner application for using the scanner on a selection screen displayed on an operations panel of the image forming apparatus; and
display, on the operations panel, an authorization process confirmation screen indicating that authorization is required to use an external storage service, in response to the selection of the print application or the scanner application, and
wherein, after completion of an authorization process of the external storage service through the authorization process confirmation screen, the image forming apparatus is coordinated with the external storage service, and the image forming apparatus is allowed to execute an image forming process using the printer or the scanner.

10. An information processing system including one or more information processing devices in which an application of a service coordinated with an electronic device of a user environment provides the service to a user operating the electronic device, the information processing system including
a processor; and
a memory that includes instructions, which when executed, cause the processor to execute the following steps:
for each application of one or more applications installed in the information processing device,
associating the application with a processing flow invoked by the application and storing the application and the associated processing flow in the memory;
associating the processing flow with a first scope of authorization representing one or more first external services that are required to be authorized by the user so that the processor is allowed to execute the processing flow, and storing the processing flow and the associated first scope in the memory;
retrieving, from the memory, the first scope of the authorization;
retrieving a second scope of authorization representing one or more second external services that have been authorized by the user; and
providing, for each first external service of the one or more first external services represented by the first scope of the authorization, information indicating whether the first external service is required to be authorized by the user, based on a result of comparing the first scope of the authorization with the second scope of the authorization.

11. The information processing system according to claim 10, wherein, upon determining that the first scope of the authorization includes a scope other than the second scope of the authorization, the step of providing provides information indicating that additional authorization is required for each first external service of the one or more first external services.

12. The information processing system according to claim 10, wherein the electronic device operated by the user and the one or more first external services are caused to be coupled by a redirection process so as to cause the electronic device and the one or more first external services to execute a process of authorizing the first scope of the authorization of the one or more first external services required by the processing flow that is associated with the application capable of being used by the user.

13. The information processing system according to claim 10, wherein, upon detecting that the user selects the application of the one or more applications to be used, the step of providing provides, for each first external service of the one or more first external services, information indicating whether the first external service is authorized, based on a result of comparing the first scope of the authorization with the second scope of the authorization.

14. The information processing system according to claim 10, wherein the steps to be executed by the processor further includes
associating identifiers of one or more third external services used by the application with first delegated authentication configuration information representing the one or more third external services for which delegated authentication is required and storing the identifiers of the one or more third external services used by the application and the associated first delegated authentication configuration information in the memory;
retrieving, from the memory, the first delegated authentication configuration information;
retrieving second delegated authentication information representing one or more specific external services, wherein the delegated authentication information has been configured by the user; and
providing, for each third external service, information indicating whether delegated authentication information has been configured based on a result of comparing the first delegated authentication configuration information with the second delegated authentication information.

15. The information processing system according to claim 14, wherein the steps to be executed by the processor further includes
receiving, for each of the one or more third external services, delegated authentication configuration information.

16. The information processing system according to claim 10, wherein the steps executed by the processor further include:
providing information indicating that additional authentication is required while providing a button for starting execution of the additional authorization.

17. The information processing system according to claim 10, wherein the steps executed by the processor further include:
merging a plurality of first scopes of authorization of a respective plurality of external services.

18. An information processing method executed by an information processing device in which an application of a service coordinated with an electronic device of a user environment provides the service to a user operating the electronic device, the information processing method comprising:
for each application of one or more applications installed in the information processing device,
associating the application with a processing flow invoked by the application and storing the application and the associated processing flow in a memory of the information processing device;
associating the processing flow with a first scope of authorization representing one or more first external services that are required to be authorized by the user so that the processor is allowed to execute the processing flow, and storing the processing flow and the associated first scope;
retrieving, from the memory, the first scope of the authorization;
retrieving a second scope of authorization representing one or more second external services that have been authorized by the user; and
providing, for each first external service of the one or more first external services represented by the first scope of the authorization, information indicating whether the first external service is required to be authorized by the user, based on a result of comparing the first scope of the authorization with the second scope of the authorization.

* * * * *